(12) United States Patent
Takeshi et al.

(10) Patent No.: US 10,811,723 B2
(45) Date of Patent: Oct. 20, 2020

(54) SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: MURATA MANUFACTURING CO., LTD., Kyoto (JP)

(72) Inventors: Kazumasa Takeshi, Kyoto (JP); Aiko Nakamura, Kyoto (JP); Shuhei Sugita, Kyoto (JP); Hiroki Mita, Kyoto (JP); Tadahiko Kubota, Kyoto (JP)

(73) Assignee: Murata Manufacturing Inc., Kyoto (JP)

( * ) Notice: Subject to any disclaimer, the term of this patent is extended or adjusted under 35 U.S.C. 154(b) by 195 days.

(21) Appl. No.: 16/000,442

(22) Filed: Jun. 5, 2018

(65) Prior Publication Data
US 2018/0287203 A1 Oct. 4, 2018

Related U.S. Application Data

(63) Continuation of application No. PCT/JP2016/083032, filed on Nov. 8, 2016.

(30) Foreign Application Priority Data

Dec. 7, 2015 (JP) .................. 2015-238432

(51) Int. Cl.
*H01M 4/04* (2006.01)
*H01M 4/66* (2006.01)
(Continued)

(52) U.S. Cl.
CPC ........... *H01M 10/0525* (2013.01); *B25F 5/00* (2013.01); *B60L 50/64* (2019.02); *C09D 127/16* (2013.01); *H01M 2/1083* (2013.01); *H01M 2/14* (2013.01); *H01M 2/26* (2013.01); *H01M 4/0404* (2013.01); *H01M 4/583* (2013.01); *H01M 4/623* (2013.01);
(Continued)

(58) Field of Classification Search
CPC ......... H01M 10/0525; H01M 10/0569; H01M 4/04; H01M 4/66; H01M 4/583
See application file for complete search history.

(56) References Cited

U.S. PATENT DOCUMENTS 5,972,539 A 10/1999 Hasegawa et al.
2002/0197536 A1 12/2002 Mori et al.
(Continued)

FOREIGN PATENT DOCUMENTS

CN 103772607 A 5/2014
JP H10-116515 A 5/1998
(Continued)

OTHER PUBLICATIONS

Machine Translation of: JP 11-080296, Tonomura, Mar. 26, 1999.*
(Continued)

*Primary Examiner* — Kenneth J Douyette
(74) *Attorney, Agent, or Firm* — K&L Gates LLP

(57) ABSTRACT

A secondary battery is provided. The secondary battery includes a positive electrode, a negative electrode, and an electrolyte layer, and the electrolyte layer includes an electrolytic solution and a copolymer containing vinylidene fluoride, hexafluoropropylene, and a hetero-unsaturated compound.

35 Claims, 5 Drawing Sheets

(51) Int. Cl.

| | | |
|---|---|---|
| *H01M 4/583* | (2010.01) | |
| *H01M 4/62* | (2006.01) | |
| *H01M 10/0525* | (2010.01) | |
| *H01M 10/0569* | (2010.01) | |
| *H01M 10/0565* | (2010.01) | |
| *H01M 10/052* | (2010.01) | |
| *B60L 50/64* | (2019.01) | |
| *B25F 5/00* | (2006.01) | |
| *C09D 127/16* | (2006.01) | |
| *H01M 2/10* | (2006.01) | |
| *H01M 2/14* | (2006.01) | |
| *H01M 2/26* | (2006.01) | |
| *H01M 10/48* | (2006.01) | |
| *H01M 10/42* | (2006.01) | |
| *H01M 10/44* | (2006.01) | |
| *H01M 4/02* | (2006.01) | |

(52) U.S. Cl.
CPC ......... *H01M 4/661* (2013.01); *H01M 10/052* (2013.01); *H01M 10/0565* (2013.01); *H01M 10/0569* (2013.01); *H01M 10/425* (2013.01); *H01M 10/443* (2013.01); *H01M 10/486* (2013.01); *H01M 2004/027* (2013.01); *H01M 2004/028* (2013.01); *H01M 2220/20* (2013.01); *H01M 2300/0025* (2013.01); *H01M 2300/0085* (2013.01); *H01M 2300/0088* (2013.01); *Y02E 60/122* (2013.01); *Y02T 10/7011* (2013.01)

(56) References Cited

U.S. PATENT DOCUMENTS

| | | | |
|---|---|---|---|
| 2007/0287069 A1 | 12/2007 | Fukui | |
| 2009/0291371 A1* | 11/2009 | Konishiike | H01M 4/134 |
| | | | 429/338 |
| 2012/0328915 A1* | 12/2012 | Hirose | H01M 10/0525 |
| | | | 429/61 |
| 2013/0149603 A1* | 6/2013 | Taki | H01M 4/587 |
| | | | 429/188 |

FOREIGN PATENT DOCUMENTS

| | | |
|---|---|---|
| JP | H11-80296 A1 | 3/1999 |
| JP | 2003-059535 A | 2/2003 |
| JP | 2009-009703 A1 | 1/2009 |
| JP | 2010-147031 A | 7/2010 |
| JP | 2011-159503 A | 8/2011 |
| JP | 2013-028710 A | 2/2013 |

OTHER PUBLICATIONS

International Search Report and Written Opinion issued in connection with International Patent Application No. PCT/JP2016/083032, dated Dec. 27, 2016. (12 pages).

Chinese Office Action dated Jul. 30, 2020, in corresponding Chinese Application No. 201680071408.5.

* cited by examiner

SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCE TO RELATED APPLICATIONS

The present application is a continuation of PCT patent application no. PCT/JP2016/083032, filed on Nov. 8, 2016, which claims priority to Japanese patent application no. JP2015-238432 filed on Dec. 7, 2015, the entire contents of which are being incorporated herein by reference.

BACKGROUND

The present technology generally relates to a secondary battery including an electrolyte layer including an electrolytic solution and a polymer compound, and a battery pack, an electric vehicle, an electric power storage system, an electric power tool, and an electronic apparatus that use the secondary battery.

Various electronic apparatuses such as a mobile phone and a personal digital assistant (PDA) have been widely used, and it has been demanded to reduce the sizes and weights of the electronic apparatuses and to achieve their long life. Accordingly, as an electric power source for the electronic apparatuses, a battery, in particular, a small and light-weight secondary battery capable of providing high energy density has been developed.

It has been considered to apply a secondary battery not only to the foregoing electronic apparatuses, but also to other applications. Examples of other applications include a battery pack detachably mounted in electronic apparatuses or the like, an electric vehicle such as an electric automobile, an electric power storage system such as a home electric power server, and an electric power tool such as an electric drill.

The secondary battery includes an electrolytic solution together with a positive electrode and a negative electrode, and the electrolytic solution is generally mounted in a secondary battery in a state of being impregnated in a separator. Other than this, the electrolytic solution may be mounted, in the secondary battery, being held by a polymer compound, in some cases. The secondary battery in this case includes an electrolyte layer that is a so-called gel electrolyte. In the secondary battery including this electrolyte layer, leakage of the electrolytic solution is prevented.

A configuration of the polymer compound contained in the electrolyte layer may largely influence battery characteristics of the secondary battery, which has led to various considerations on the configuration of the polymer compound.

SUMMARY

The present technology generally relates to a secondary battery including an electrolyte layer including an electrolytic solution and a polymer compound, and a battery pack, an electric vehicle, an electric power storage system, an electric power tool, and an electronic apparatus that use the secondary battery.

It is desirable to provide a secondary battery, a battery pack, an electric vehicle, an electric power storage system, an electric power tool, and an electronic apparatus that are capable of providing excellent battery characteristics.

According to an embodiment of the present technology, a secondary battery is provided. The secondary battery includes a positive electrode, a negative electrode, and an electrolyte layer, and the electrolyte layer includes an electrolytic solution and a copolymer, and the copolymer includes vinylidene fluoride, hexafluoropropylene, and a hetero-unsaturated compound.

Each of a battery pack, an electric vehicle, an electric power storage system, an electric power tool, and an electronic apparatus according to an embodiment of the present technology includes a secondary battery, and the secondary battery has a configuration similar to that of the secondary battery of the embodiment of the present technology described herein.

Here, the "hetero-unsaturated compound" is a generic name of a compound including a carbon-carbon double bond ($>C=C<$) and containing a heteroatom as a constituent atom. The number of carbon-carbon double bonds included in the hetero-unsaturated compound may be one, or two or more. The "heteroatom" means one or more of atoms other than a carbon atom (C) and a hydrogen atom (H), and the kind of the heteroatom contained in the hetero-unsaturated compound may be one, or two or more.

According to an embodiment of the present technology, the copolymer included in the electrolyte layer includes vinylidene fluoride, hexafluoropropylene, and a hetero-unsaturated compound, so that excellent battery characteristics can be obtained.

In addition, the same effect can be provided by the battery pack, the electric vehicle, the electric power storage system, the electric power tool, or the electronic apparatus according to an embodiment of the present technology.

It should be understood that the effects described herein are non-limiting, and other suitable properties relating to the present technology may be realized and as further described.

DETAILED DESCRIPTION

The present technology generally relates to a secondary battery including an electrolyte layer including an electrolytic solution and a polymer compound, and a battery pack, an electric vehicle, an electric power storage system, an electric power tool, and an electronic apparatus that use the secondary battery.

As described herein, the present disclosure will be described based on examples with reference to the figures, but the present disclosure is not to be considered limited to the examples, and various numerical values and materials in the examples are considered by way of example.

First, a secondary battery according to an embodiment of the present technology is described.

Figure 1:
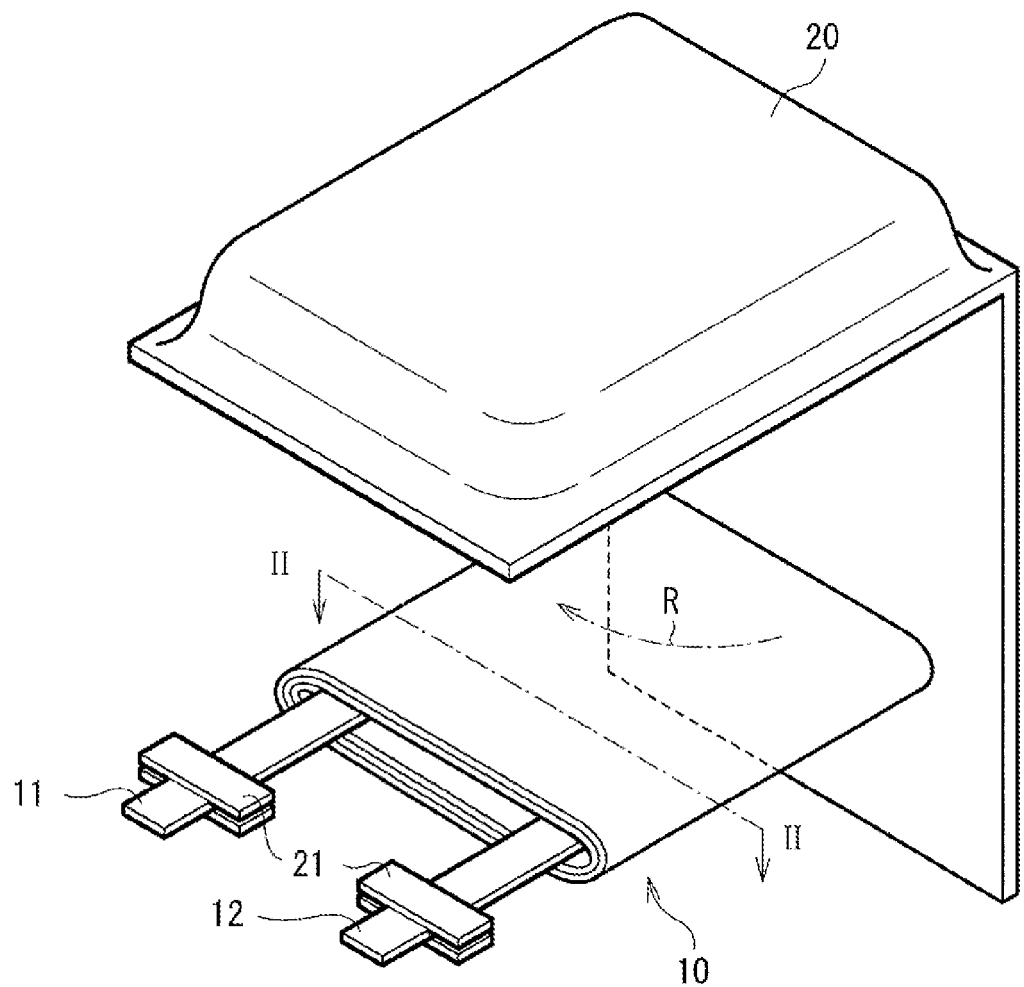
FIG. 1 is a perspective view illustrating a configuration of a secondary battery (laminated-film-type) according to an embodiment of the present technology.
Figure 2:
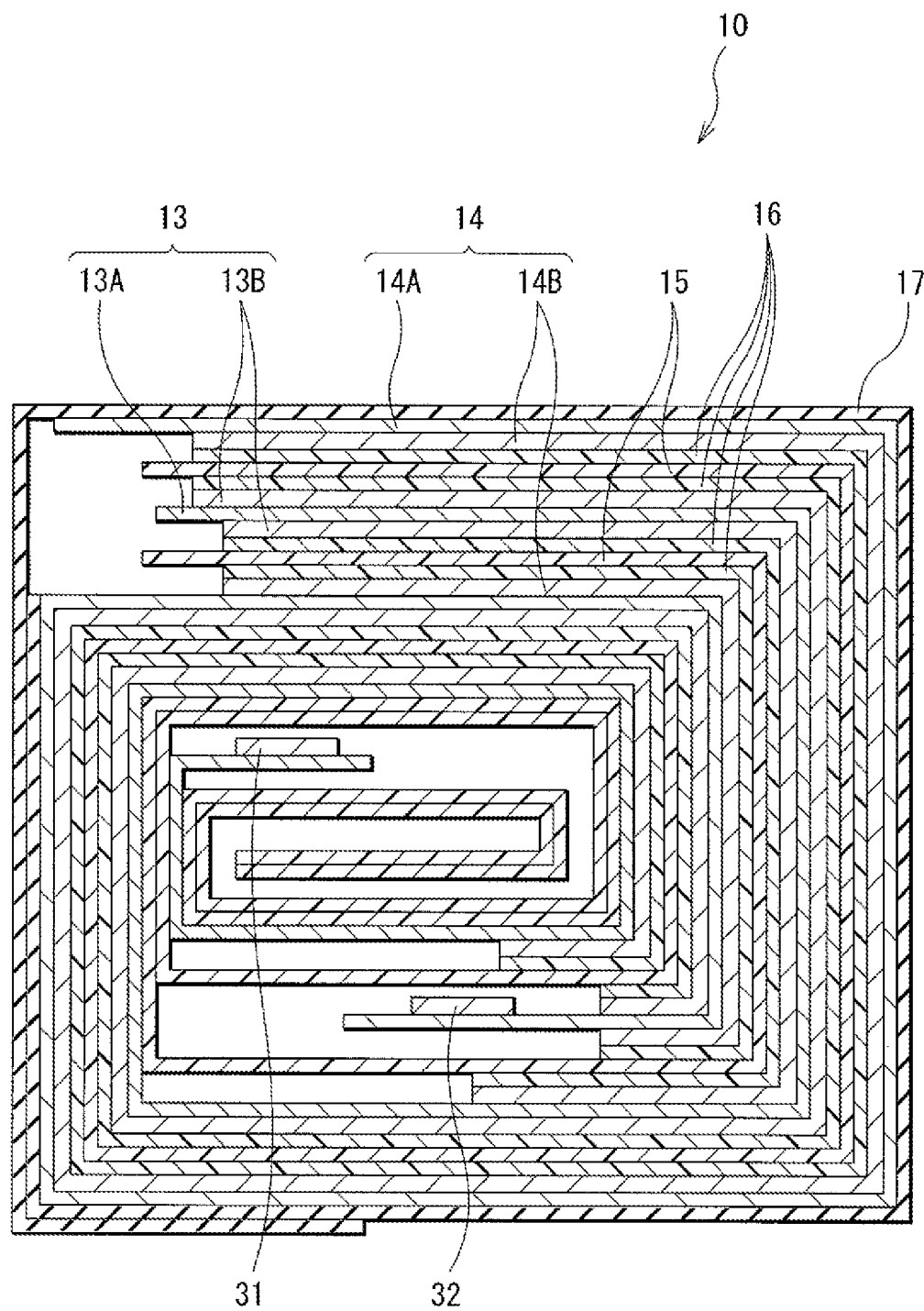
FIG. 2 is a cross-sectional view of a spirally wound electrode body taken along a line II-II illustrated in FIG. 1.

FIG. 1 shows a perspective configuration of a secondary battery according to an embodiment. FIG. 2 illustrates a cross-sectional configuration of a spirally wound electrode body 10 taken along a line II-II illustrated in FIG. 1.

The secondary battery described herein obtains capacity of a negative electrode 14 by insertion and extraction of an electrode reactant, and has a so-called laminated-film-type battery structure.

"Electrode reactant" is a substance related to an electrode reaction. To give an example, in a lithium ion secondary battery in which battery capacity is obtained by insertion and extraction of lithium (Li), the electrode reactant is lithium (or lithium ion). Description is provided below referring to, as an example, a case where the secondary battery of the present technology is a lithium ion secondary battery.

In the secondary battery, for example, as illustrated in FIG. 1, the spirally wound electrode body 10 as a battery element is contained inside a film-like outer package member 20. In the spirally wound electrode body 10, for example, a positive electrode 13 and a negative electrode 14 stacked with a separator 15 and an electrolyte layer 16 interposed therebetween are spirally wound. A positive electrode lead 11 is attached to the positive electrode 13, and a negative electrode lead 12 is attached to the negative electrode 14. An outermost periphery of the spirally wound electrode body 10 is protected by a protective tape 17.

The positive electrode lead 11 is led out from inside to outside of the outer package member 20, for example. The positive electrode lead 11 contains, for example, one or more of conductive materials such as aluminum (Al). The negative electrode lead 12 is led out from inside to outside of the outer package member 20 in the same direction as the positive electrode lead 11, for example. The negative electrode lead 12 contains, for example, one or more of conductive materials such as copper (Cu), nickel (Ni), and stainless steel. These conductive materials may be in the shape of, for example, a thin plate or mesh.

The outer package member 20 is, for example, one film that is foldable in a direction of an arrow R illustrated in FIG. 1, and the outer package member 20 has a depression for containing the spirally wound electrode body 10 in part thereof. The outer package member 20 is a laminated film in which a fusion-bonding layer, a metal layer, and a surface protective layer are stacked in this order, for example. In a process of manufacturing the secondary battery, the outer package member 20 is folded such that portions of the fusion-bonding layer face each other with the spirally wound electrode body 10 interposed therebetween, and outer edges of the portions of the fusion-bonding layer are fusion-bonded. Alternatively, two laminated films bonded to each other by, for example, an adhesive may form the outer package member 20. The fusion-bonding layer includes, for example, one or more of films of polyethylene, polypropylene, and other materials. The metal layer includes, for example, one or more of an aluminum foil and the like. The surface protective layer includes, for example, one or more of films of nylon, polyethylene terephthalate, and other materials.

In particular, the outer package member 20 is preferably an aluminum laminated film in which a polyethylene film, an aluminum foil, and a nylon film are stacked in this order. However, the outer package member 20 may be a laminated film having any other laminated structure, a polymer film such as polypropylene, or a metal film.

For example, a close-contact film 21 is inserted between the outer package member 20 and the positive electrode lead 11 in order to prevent entrance of the outside air. Moreover, for example, the close-contact film 21 is inserted between the outer package member 20 and the negative electrode lead 12. The close-contact film 21 contains one or more of materials having close-contact characteristics to both the positive electrode lead 11 and the negative electrode lead 12. Examples of the material having close-contact characteristics include polyolefin resin, and more specific examples thereof include polyethylene, polypropylene, modified polyethylene, and modified polypropylene.

As shown in FIG. 2, the positive electrode 13 includes, for example, a positive electrode current collector 13A and a positive electrode active material layer 13B provided on the positive electrode current collector 13A.

The positive electrode active material layer 13B may be provided on only one surface or both surfaces of the positive electrode current collector 13A. FIG. 2 illustrates, for example, the case where the positive electrode active material layers 13B are provided on both surfaces of the positive electrode current collector 13A.

The positive electrode current collector 13A contains, for example, one or more of conductive materials. The kind of the conductive material is not particularly limited; however, examples of the conductive material include metal materials such as aluminum, nickel, and stainless steel, and an alloy containing two or more kinds of the metal materials may be used. The positive electrode current collector 13A may be configured of a single layer, or may be configured of multiple layers.

The positive electrode active material layer 13B includes one or more of positive electrode materials capable of inserting and extracting lithium as a positive electrode active material. However, the positive electrode active material layer 13B may further contain one or more of other materials such as a positive electrode binder and a positive electrode conductive agent.

The positive electrode material is preferably one or more of lithium-containing compounds. The kind of the lithium-containing compound is not specifically limited, but in particular is preferably a lithium-containing composite oxide and a lithium-containing phosphate compound. This is because a high energy density can be obtained.

The "lithium-containing composite oxide" is an oxide containing lithium and one or more of elements other than lithium (the elements are hereinafter referred to as "other elements") as constituent elements. The lithium-containing oxide has, for example, one or more crystal structures such as a layered rock-salt type crystal structure and a spinel type crystal structure.

The "lithium-containing phosphate compound" is a phosphate compound containing lithium and one or more of other elements as constituent elements. The lithium-containing phosphate compound has, for example, one or more crystal structures such as an olivine type crystal structure.

The kind of the other element is not particularly limited as long as the other element is one or more of arbitrary elements (except for lithium). In particular, the other elements are preferably one or more of elements that belong to Groups 2 to 15 in the long-periodic table. More specifically, the other elements are more preferably one or more of metal elements of nickel, cobalt, manganese, iron, and the like. This is because a high voltage can be obtained.

Examples of the lithium-containing composite oxide having the layered rock-salt type crystal structure include one or more of compounds represented by the following respective formulas (1) to (3).

$$Li_aMn_{(1-b-c)}Ni_bM1_cO_{(2-d)}F_e \qquad (1)$$

(M1 is at least one element of cobalt, magnesium, aluminum, boron, titanium, vanadium, chromium, iron, copper, zinc, zirconium, molybdenum, tin, calcium, strontium, and tungsten. "a" to "e" satisfy $0.8 \leq a \leq 1.2$, $0 < b < 0.5$, $0 \leq c \leq 0.5$, $(b+c) < 1$, $-0.1 \leq d \leq 0.2$, and $0 \leq e \leq 0.1$. It is to be noted that the composition of lithium varies depending on charge and discharge states, and "a" is a value in a completely-discharged state.)

$$Li_aNi_{(1-b)}M2_bO_{(2-c)}F_d \qquad (2)$$

(M2 is at least one element of cobalt, manganese, magnesium, aluminum, boron, titanium, vanadium, chromium, iron, copper, zinc, molybdenum, tin, calcium, strontium, and tungsten. "a" to "d" satisfy a $0.8 \leq a \leq 1.2$, $0.005 < b < 0.5$, $-0.1 \leq c \leq 0.2$, and $0 \leq d \leq 0.1$. It is to be noted that the composition of lithium varies depending on charge and discharge states, and "a" is a value in a completely-discharged state.)

$$Li_aCo_{(1-b)}M3_bO_{(2-c)}F_d \qquad (3)$$

(M3 is at least one element of nickel, manganese, magnesium, aluminum, boron, titanium, vanadium, chromium, iron, copper, zinc, molybdenum, tin, calcium, strontium, and tungsten. "a" to "d" satisfy $0.8 \leq a \leq 1.2$, $0 \leq b < 0.5$, $-0.1 \leq c \leq 0.2$, and $0 \leq d \leq 0.1$. It is to be noted that the composition of lithium varies depending on charge and discharge states, and "a" is a value in a completely-discharged state.)

Examples of the lithium-containing composite oxide having the layered rock-salt type crystal structure include $LiNiO_2$, $LiCoO_2$, $LiCO_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

In the case where the lithium-containing composite oxide having the layered rock-salt type crystal structure contains, as constituent elements, nickel, cobalt, manganese, and aluminum, an atomic ratio of nickel is preferably not less than 50 at %. This is because a high energy density can be obtained.

Examples of the lithium-containing composite oxide having the spinel type crystal structure include compounds represented by the following formula (4).

$$Li_aMn_{(2-b)}M4_bO_cF_d \qquad (4)$$

(M4 is at least one element of cobalt, nickel, magnesium, aluminum, boron, titanium, vanadium, chromium, iron, copper, zinc, molybdenum, tin, calcium, strontium, and tungsten. "a" to "d" satisfy $0.9 \leq a \leq 1.1$, $0 \leq b \leq 0.6$, $3.7 \leq c \leq 4.1$, and $0 \leq d \leq 0.1$. It is to be noted that the composition of lithium varies depending on charge and discharge states, and "a" is a value in a completely-discharged state.)

Examples of the lithium-containing composite oxide having the spinel type crystal structure include $LiMn_2O_4$.

Examples of the lithium-containing phosphate compound having the olivine type crystal structure include compounds represented by the following formula (5).

$$Li_aM5PO_4 \qquad (5)$$

(M5 is at least one element of cobalt, manganese, iron, nickel, magnesium, aluminum, boron, titanium, vanadium, niobium, copper, zinc, molybdenum, calcium, strontium, tungsten, and zirconium. "a" satisfies $0.9 \leq a \leq 1.1$. It is to be noted that the composition of lithium varies depending on charge and discharge states, and "a" is a value in a completely-discharged state.)

Examples of the lithium-containing phosphate compound having the olivine type crystal structure include $LiFePO_4$, $LiMnPO_4$, $LiFe_{0.5}Mn_{0.5}PO_4$, and $LiFe_{0.3}Mn_{0.7}PO_4$.

The lithium-containing composite oxide may be, for example, a compound represented by the following formula (6).

$$(Li_2MnO_3)_x(LiMnO_2)_{1-x} \qquad (6)$$

(x satisfies $0 \leq x \leq 1$.)

In addition, the positive electrode material may be, for example, an oxide, a disulfide, a chalcogenide, or a conductive polymer. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene.

However, the positive electrode material is not limited to the foregoing materials, and other materials may be used.

The positive electrode binder contains, for example, one or more of synthetic rubber, polymer compounds, and the like. Examples of the synthetic rubber include styrene-butadiene-based rubber, fluororubber, and ethylene propylene diene. Examples of the polymer compounds include polyvinylidene fluoride, polyacrylic acid, and polyimide.

The positive electrode conductive agent contains, for example, one or more of carbon materials and the like. Examples of the carbon materials include graphite, carbon black, acetylene black, and Ketjen black. It is to be noted that the positive electrode conductive agent may be a metal material, a conductive polymer, or the like as long as the positive electrode conductive agent has electric conductivity.

As shown in FIG. 2, the negative electrode 14 includes, for example, a negative electrode current collector 14A and a negative electrode active material layer 14B provided on the negative electrode current collector 14A.

The negative electrode active material layer 14B may be provided on only one surface or both surfaces of the negative electrode current collector 14A. FIG. 2 illustrates, for example, the case where the negative electrode active material layers 14B are provided on both surfaces of the negative electrode current collector 14A.

The negative electrode current collector 14A contains, for example, one or more of conductive materials. The kind of the conductive material is not particularly limited; however, examples of the conductive material include metal materials such as copper, aluminum, nickel, and stainless steel, and an alloy containing two or more kinds of the metal materials may be used. The negative electrode current collector 14A may be configured of a single layer, or may be configured of multiple layers.

A surface of the negative electrode current collector 14A may be preferably roughened. This makes it possible to improve close-contact characteristics of the negative electrode active material layer 14B with respect to the negative electrode current collector 14A by a so-called anchor effect. In this case, it is enough that the surface of the negative electrode current collector 14A at least in a region facing the negative electrode active material layer 14A is roughened. Examples of the roughening method include a method of forming fine particles by utilizing electrolytic treatment. Through the electrolytic treatment, fine particles are formed on the surface of the negative electrode current collector 14A in an electrolytic bath by an electrolytic method to make the surface of the negative electrode current collector 14A rough. A copper foil fabricated by an electrolytic method is generally called "electrolytic copper foil."

The negative electrode active material layer 14B includes one or more of negative electrode materials capable of inserting and extracting lithium as a negative electrode active material. However, the negative electrode active material layer 14B may further contain one or more of materials such as a negative electrode binder and a negative electrode conductive agent. Details of the negative electrode binder and the negative electrode conductive agent are, for example, similar to those of the positive electrode binder and the positive electrode conductive agent.

However, the chargeable capacity of the negative electrode material is preferably larger than the discharge capacity of the positive electrode 13 for the purpose of preventing lithium metal from being unintentionally precipitated on the negative electrode 14 in the middle of charging. That is, the electrochemical equivalent of the negative electrode material capable of inserting and extracting lithium is preferably larger than the electrochemical equivalent of the positive electrode 13.

The negative electrode material is, for example, one or more of carbon materials. The carbon material causes an extremely small change in a crystal structure thereof when lithium is inserted or extracted, which stably achieves high energy density. Further, the carbon material also serves as the negative electrode conductive agent, which improves conductivity of the negative electrode active material layer 22B.

Examples of the carbon material include graphitizable carbon, non-graphitizable carbon, and graphite. It is to be noted that a spacing of (002) plane in the non-graphitizable carbon is preferably not less than 0.37 nm, and a spacing of (002) plane in the graphite is preferably not more than 0.34 nm. More specific examples of the carbon material include pyrolytic carbons, cokes, glassy carbon fibers, an organic polymer compound fired body, activated carbon, and carbon blacks. Examples of the cokes include pitch coke, needle coke, and petroleum coke. The organic polymer compound fired body is obtained by firing (carbonizing) a polymer compound such as phenol resin and furan resin at appropriate temperature. Other than the materials mentioned above, the carbon material may be low crystalline carbon subjected to a heat treatment at temperature of about 1000° C. or lower, or may be amorphous carbon. The shape of the carbon material may be any of a fibrous shape, a spherical shape, a granular shape, and a scale-like shape.

Further, the negative electrode material is, for example, a material (metal-based material) containing one or more of metal elements and metalloid elements as constituent elements. This is because a high energy density can be obtained.

The metal-based material may be a simple substance, an alloy, or a compound, may be two or more thereof, or may have one or more phases thereof in part or all thereof. It is to be noted that the alloy also encompasses a material that contains one or more metal elements and one or more metalloid elements, in addition to a material configured of two or more metal elements. Further, the alloy may contain a non-metallic element. Examples of the structure of the metal-based material include a solid solution, a eutectic crystal (a eutectic mixture), an intermetallic compound, and a structure in which two or more thereof coexist.

The metal elements and the metalloid elements described above are, for example, one or more of metal elements and metalloid elements that are able to form an alloy with lithium. Specific examples thereof include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

In particular, silicon or tin or both is preferable. The reason for this is that silicon and tin have a superior ability of inserting and extracting lithium, and therefore provide significantly high energy density.

A material that contains silicon, tin, or both as constituent elements may be any of a simple substance, an alloy, and a compound of silicon, may be any of a simple substance, an alloy, and a compound of tin, may be two or more thereof, or may be a material that has one or more phases thereof at least in part. The "simple substance" described herein merely refers to a simple substance in a general sense (in which a small amount of impurity may be contained), and does not necessarily refer to a simple substance having a purity of 100%.

The alloy of silicon contains, for example, one or more of elements such as tin, nickel, copper, iron, cobalt, manganese, zinc, indium, silver, titanium, germanium, bismuth, antimony, and chromium, as constituent elements other than silicon. The compound of silicon contains, for example, one or more of elements such as carbon and oxygen as constituent elements other than silicon. The compound of silicon contains, for example, one or more of the elements described related to the alloy of silicon, as constituent elements other than silicon.

Specific examples of the alloy of silicon and the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and LiSiO. v in $SiO_v$ may be $0.2<v<1.4$.

The alloy of tin contains, for example, one or more of elements such as silicon, nickel, copper, iron, cobalt, manganese, zinc, indium, silver, titanium, germanium, bismuth, antimony, and chromium, as constituent elements other than tin. The compound of tin contains, for example, one or more of elements such as carbon and oxygen as constituent elements other than tin. The compound of tin contains, for example, one or more of the elements described related to the alloy of tin, as constituent elements other than tin.

Specific examples of the alloy of tin and the compound of tin include $SnO_w$ ($0<w\leq2$), $SnSiO_3$, LiSnO, and $Mg_2Sn$.

In particular, the material containing tin as a constituent element is preferably, for example, a material (Sn-containing material) that contains, together with tin as a first constituent element, a second constituent element and a third constituent element. The second constituent element includes, for example, one or more of elements such as cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. The third constituent element includes, for example, one or more of elements such as boron, carbon, aluminum, and phosphorus (P). This is because the Sn-containing material containing the second constituent element and the third constituent element makes it possible to achieve, for example, high battery capacity and superior cycle characteristics.

In particular, the Sn-containing material is preferably a material (a SnCoC-containing material) that contains tin, cobalt, and carbon as constituent elements. In the SnCoC-containing material, for example, a content of carbon is from 9.9% to 29.7%, and a ratio of contents of tin and cobalt (Co/(Sn+Co)) is from 20% to 70%. This is because a high energy density can be obtained.

The SnCoC-containing material preferably has a phase that contains tin, cobalt, and carbon, and the phase is preferably low crystalline or amorphous. The phase is a phase (reaction phase) capable of reacting with lithium, and therefore existence of the reaction phase results in achievement of superior characteristics. Naturally, the reaction phase may include a low crystalline portion and an amorphous portion. A half width (a diffraction angle $2\theta$) of a diffraction peak obtained by X-ray diffraction of this reaction phase may be preferably 1° or larger in the case where a CuK$\alpha$ ray is used as a specific X-ray, and an insertion rate is 1°/min. This makes it possible to insert and extract lithium more smoothly in the SnCoC-containing material, and to decrease reactivity of the SnCoC-containing material with the electrolytic solution. In some cases, the SnCoC-containing material may include a phase that contains simple substances of the respective constituent elements or part thereof in addition to the low-crystalline phase or the amorphous phase.

For example, comparison between X-ray diffraction charts before and after an electrochemical reaction with lithium makes it possible to easily determine whether the diffraction peak obtained by the X-ray diffraction corresponds to the reaction phase that is able to react with lithium. Specifically, for example, if a position of the diffraction peak after the electrochemical reaction with lithium is changed from the position of the diffraction peak before the electrochemical reaction with lithium, the obtained diffraction peak corresponds to the reaction phase that is able to react with lithium. In this case, for example, the diffraction peak of the low-crystalline reaction phase or the amorphous reaction phase is seen in a range of $2\theta=20°$ to $50°$. Such a reaction phase includes, for example, the respective constituent elements described above, and it is considered that such a reaction phase has become low crystalline or amorphous mainly because of existence of carbon.

In the SnCoC-containing material, part or all of carbon that is the constituent element thereof is preferably bound to a metal element or a metalloid element that is another constituent element thereof. This is because cohesion or crystallization of, for example, tin is suppressed. It is possible to confirm a binding state of the elements, for example, by an X-ray photoelectron spectroscopy method (XPS). In a commercially available device, for example, an Al-K$\alpha$ ray or an Mg-K$\alpha$ ray is used as a soft X-ray. In the case where part or all of carbon are bound to a metal element, a metalloid element, or the like, the peak of a synthetic wave of is orbit of carbon (C1s) appears in a region lower than 284.5 eV. It is assumed that energy calibration is made so that the peak of 4f orbit of a gold atom (Au4f) is obtained at 84.0 eV. At this time, in general, since surface contamination carbon exists on the material surface, the peak of C1s of the surface contamination carbon is regarded as 284.8 eV, and this peak is used as energy standard. In XPS measurement, the waveform of the peak of C1s is obtained as a form including the peak of the surface contamination carbon and the peak of carbon in the SnCoC-containing material. The two peaks may be therefore separated from each other, for example, by analysis with use of commercially available software. In the analysis of the waveform, the position of the main peak existing on the lowest bound energy side is set to the energy reference (284.8 eV).

The SnCoC-containing material is not limited to the material (SnCoC) that contains only tin, cobalt, and carbon as constituent elements The SnCoC-containing material may further contain, for example, one or more of elements such as silicon, iron, nickel, chromium, indium, niobium, germanium, titanium, molybdenum, aluminum, phosphorus, gallium, and bismuth, as constituent elements, in addition to tin, cobalt, and carbon.

Other than the SnCoC-containing material, a material (a SnCoFeC-containing material) that contains tin, cobalt, iron, and carbon as constituent elements is also preferable. Any composition of the SnCoFeC-containing material may be adopted. To give an example, in the case where a content of iron is set smaller, a content of carbon is from 9.9% to 29.7%, a content of iron is from 0.3% to 5.9%, and a ratio of contents of tin and cobalt (Co/(Sn+Co)) is from 30% to 70%. Alternatively, in the case where the content of iron is set larger, the content of carbon is from 11.9% to 29.7%, the ratio of contents of tin, cobalt, and iron ((Co+Fe)/(Sn+Co+Fe)) is from 26.4% to 48.5%, and the ratio of contents of cobalt and iron (Co/(Co+Fe)) is from 9.9% to 79.5%. Such composition ranges allow for achievement of high energy density. Physical characteristics (such as a half width) of the SnCoFeC-containing material are similar to physical characteristics of the foregoing SnCoC-containing material.

Other than the materials mentioned above, the negative electrode material may be, for example, one or more of a metal oxide, a polymer compound, and the like. Examples of the metal oxide include iron oxide, ruthenium oxide, and molybdenum oxide. Examples of the polymer compound include polyacetylene, polyaniline, and polypyrrole.

In particular, the negative electrode material preferably contains both the carbon material and the metal-based material for the following reasons.

The metal-based material, in particular, the material containing one or both of silicon and tin as constituent elements has a concern that such a material is easily and radically expanded or contracted at the time of charge and discharge, whereas such a material has an advantage of high theoretical capacity. In contrast, the carbon material has an advantage that the carbon material is less prone to be expanded or contracted at the time of charge and discharge, whereas the carbon material has a concern of low theoretical capacity. Accordingly, using both the carbon material and the metal-based material makes it possible to suppress expansion and contraction during charging and discharging while achieving high theoretical capacity (in other words, high battery capacity).

The negative electrode active material layer 14B is formed by, for example, one or more of a coating method, a gas phase method, a liquid phase method, a spraying method, and a firing method (sintering method). The coating method is a method in which, for example, after a particulate (powder) negative electrode active material is mixed with a negative electrode binder and the like, the mixture is dispersed in an organic solvent, and the negative electrode current collector 14A is coated with the resultant. Examples of the gas phase method include a physical deposition method and a chemical deposition method. More specifically, examples thereof include vacuum evaporation method, sputtering method, ion plating method, laser ablation method, thermal chemical vapor deposition method, chemical vapor deposition (CVD) method, and plasma chemical vapor deposition method. Examples of the liquid phase method include electrolytic plating method and electroless plating method. The spraying method is a method in which a negative electrode active material in a fused state or a semi-fused state is sprayed onto the surface of the negative electrode current collector 14A. The firing method is, for example, a method in which after the negative electrode current collector 14A is coated with the mixture dispersed in, for example, the organic solvent by the coating method, the mixture is subjected to heat treatment at a temperature higher than the melting point of the negative electrode binder or the like. Examples of the firing method include atmosphere firing method, reactive firing method, and hot press firing method.

In the secondary battery, as described above, the electrochemical equivalent of the negative electrode material capable of inserting and extracting lithium is larger than the electrochemical equivalent of the positive electrode for the purpose of preventing lithium from being unintentionally precipitated on the negative electrode 14 in the middle of charge. Further, in the case where an open circuit voltage (that is, a battery voltage) in a completely-charged state is not less than 4.25 V, an extraction amount of lithium per unit mass is larger than that in the case where the open circuit voltage is 4.20 V, even if the same positive electrode active material is used, and therefore amounts of the positive electrode active material and the negative electrode active material are adjusted in accordance therewith. Accordingly, high energy density is obtained.

The separator 15 is disposed between the positive electrode 13 and the negative electrode 14. As a result, the positive electrode 13 and the negative electrode 14 are isolated with the separator 15 interposed therebetween. The separator 15 allows lithium ions to pass therethrough while preventing short circuit resulting from contact of the positive electrode 13 and the negative electrode 14.

The separator 15 contains, for example, one or more of porous films made of synthetic resin, ceramics, or the like. The separator 15 may be a laminated film in which two or more porous films are stacked. The synthetic resin includes, for example, one or more of elements such as polytetrafluoroethylene, polypropylene, and polyethylene.

The separator 15 may include, for example, the foregoing porous film (base material layer) and a polymer compound layer provided on the base material layer. The reason for this is that, this allows for an improvement in close-contact characteristics of the separator 15 with respect to each of the positive electrode 13 and the negative electrode 14, thereby suppressing deformation of the spirally wound electrode body 10. This makes it possible to suppress decomposition reaction of the electrolytic solution and to suppress liquid leakage of the electrolytic solution with which the base material layer is impregnated. Accordingly, electric resistance is less prone to increase even if charge and discharge are repeated, and swollenness of the secondary battery is suppressed.

The polymer compound layer may be provided on a single surface or both surfaces of the base material layer. The polymer compound layer includes, for example, one or more of polymer compounds such as polyvinylidene fluoride. This is because polyvinylidene fluoride has superior physical strength and is electrochemically stable. When the polymer compound layer is formed, for example, the base material layer is coated with a solution prepared by dissolving the polymer compound in, for example, an organic solvent, and thereafter, the base material layer is dried. Alternatively, the base material layer may be immersed in the solution, and thereafter the base material layer may be dried.

The electrolyte layer 16 includes an electrolytic solution and a polymer compound, and in the electrolyte layer 16, the electrolytic solution is held by the polymer compound. That is, the electrolyte layer 16 described here is a so-called gel electrolyte. The electrolyte layer 16 is used because high ion conductivity (for example, 1 mS/cm or higher at room temperature) is achieved, and, at the same time, liquid leakage of the electrolytic solution is prevented.

The polymer compound includes one or more of specific copolymers. The "specific copolymer" is a copolymer containing vinylidene fluoride, hexafluoropropylene, and a hetero-unsaturated compound as components (polymerization units).

"The copolymer contains vinylidene fluoride, hexafluoropropylene, and a hetero-unsaturated compound as components" means that three or more of raw materials (so-called monomers) containing vinylidene fluoride, hexafluoropropylene, and a hetero-unsaturated compound are used, and the copolymer is formed by polymerization reaction of the three or more of raw materials.

In detail, each of vinylidene fluoride, hexafluoropropylene, and the hetero-unsaturated compound is a raw material (monomer) for forming a specific copolymer. Each of vinylidene fluoride and hexafluoropropylene includes an unsaturated bond (carbon-carbon double bond). The hetero-unsaturated compound includes an unsaturated bond, as described later. Thus, in a process of forming the copolymer, vinylidene fluoride, hexafluoropropylene, and the hetero-unsaturated compound are subjected to polymerization reaction (are polymerized) by utilizing the unsaturated bond (carbon-carbon double bond) included in each of the vinylidene fluoride, the hexafluoropropylene, and the hetero-unsaturated compound.

Hereinafter, in order to distinguish from a copolymer which does not contain the above three kinds of components, the copolymer containing the above three kinds of components is referred to as a "specific copolymer".

The specific copolymer described here is a so-called random copolymer. Along with this, the sequence (coupling) order of components (monomers) such as vinylidene fluoride, hexafluoropropylene, and the hetero-unsaturated compound in the specific copolymer is not particularly limited.

The reason why the polymer compound includes the specific copolymer is that high ion conductivity is obtained in the electrolyte layer 16 and the physical strength (shape stability) of the electrolyte layer 16 is secured. Accordingly, even if the secondary battery is charged and discharged under severe conditions such as a low temperature environment, the discharge capacity is unlikely to decrease.

The configuration of the specific copolymer is not particularly limited as long as the specific copolymer contains vinylidene fluoride, hexafluoropropylene, and the hetero-unsaturated compound as components as described above. Details regarding the configuration of the specific copolymer are as follows, for example.

Vinylidene fluoride is a component mainly playing a role of improving the physical strength and electrochemical stability of the electrolyte layer 16. Although the copolymerization amount of vinylidene fluoride in the specific copolymer is not particularly limited, it is, for example, 70 wt % to 98.9 wt %. This is because the copolymerization amount of vinylidene fluoride is optimized, so that higher ionic conductivity is obtained in the electrolyte layer 16 and the physical strength of the electrolyte layer 16 is further improved.

Hexafluoropropylene is a component mainly playing a role of improving the ionic conductivity of the electrolyte layer 16. Although the copolymerization amount of hexafluoropropylene in the specific copolymer is not particularly limited, it is, for example, 1 wt % to 20 wt %. This is because the copolymerization amount of hexafluoropropylene is optimized, so that higher ionic conductivity is obtained in the electrolyte layer 16 and the physical strength of the electrolyte layer 16 is further improved.

The hetero-unsaturated compound is a component mainly playing a role of improving the physical strength and liquid retaining property of the electrolyte layer 16. Although the copolymerization amount (wt %) of the hetero-unsaturated compound in the specific copolymer is not particularly limited, it is, for example, 0.1 wt % to 10 wt %. This is because the copolymerization amount of the hetero-unsaturated compound is optimized, so that higher ionic conductivity is obtained in the electrolyte layer 16 and the physical strength of the electrolyte layer 16 is further improved.

Here, the "hetero-unsaturated compound" is a generic name of a compound including a carbon-carbon double bond and containing a heteroatom as a constituent atom, as described above. The number of carbon-carbon double bonds included in the hetero-unsaturated compound may be one, or two or more. The "heteroatom" means one or more of atoms other than a carbon atom and a hydrogen atom, and the kind of the heteroatom contained in the hetero-unsaturated compound may be one, or two or more.

The kind of the heteroatom is not particularly limited as long as the heteroatom is one or more of atoms other than a carbon atom and a hydrogen atom. In particular, the heteroatom is preferably a nitrogen atom (N), a sulfur atom (S), a phosphorus atom (P), or the like. This is because the hetero-unsaturated compound can sufficiently play the foregoing role.

The configuration of the hetero-unsaturated compound is not particularly limited as long as the hetero-unsaturated compound includes a carbon-carbon double bond and contains a heteroatom as a constituent atom. Details regarding the configuration of the hetero-unsaturated compound are as follows, for example.

When the hetero-unsaturated compound contains a nitrogen atom as a constituent atom, the hetero-unsaturated compound contains one or more of nitrogen-containing groups. The "nitrogen-containing group" is a generic name of a group containing a nitrogen atom as a constituent atom.

The kind of the nitrogen-containing group is not particularly limited and may be, for example, a cyano group (—CN), a nitro group (—NO$_2$), an amino group (—NH$_2$), or the like.

The configuration of the hetero-unsaturated compound containing the nitrogen-containing group together with the carbon-carbon double bond is not particularly limited. Specifically, the hetero-unsaturated compound containing the nitrogen-containing group together with the carbon-carbon double bond contains, for example, one or more of compounds represented by the following respective chemical formulas (1) to (3). The compounds represented by the chemical formulas (1) to (3) contain a cyano group as the nitrogen-containing group.

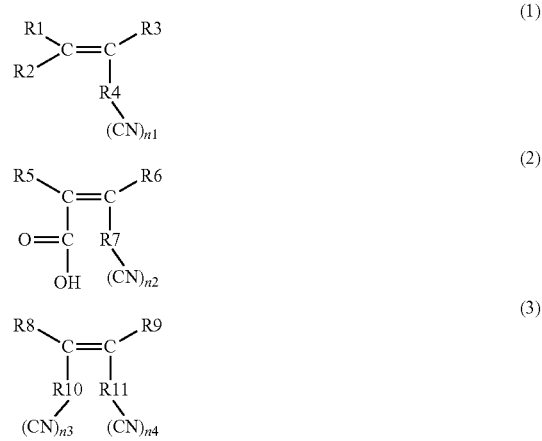

(where each of R1 to R3, R5, R6, R8, and R9 includes one or more of a hydrogen group, a monovalent hydrocarbon group, and a monovalent halogenated hydrocarbon group. R4 includes one or more of a (1+n1)-valent oxygen-containing hydrocarbon group and a (1+n1)-valent halogenated oxygen-containing hydrocarbon group. R7 includes one or more of a (1+n2)-valent oxygen-containing hydrocarbon group and a (1+n2)-valent halogenated oxygen-containing hydrocarbon group. R10 includes one or more of a (1+n3)-valent oxygen-containing hydrocarbon group and a (1+n3)-valent halogenated oxygen-containing hydrocarbon group. R11 includes one or more of a (1+n4)-valent oxygen-containing hydrocarbon group and a (1+n4)-valent halogenated oxygen-containing hydrocarbon group. Each of n1 to n4 is an integer of not less than 1. However, each of R4, R7, R10 and R11 may be optionally omitted according to an embodiment of the present technology.)

The "monovalent hydrocarbon group" is a generic name of a monovalent group constituted of carbon and hydrogen. The monovalent hydrocarbon group may have a straight-chain structure or a branched structure with one or more side chains. The monovalent hydrocarbon group may be an unsaturated hydrocarbon group having one or more carbon-carbon multiple bonds or a saturated hydrocarbon group not having the carbon-carbon multiple bond. Examples of the carbon-carbon multiple bond include a carbon-carbon double bond (>C=C<) and a carbon-carbon triple bond (—C≡C—).

Examples of the monovalent hydrocarbon group include an alkyl group, an alkenyl group, an alkynyl group, a cycloalkyl group, an aryl group, and a monovalent group in which two or more of them are bound (hereinafter referred to as a "monovalent binding group").

Examples of the monovalent binding group include monovalent groups such as a group in which an alkyl group and an alkenyl group are bound; a group in which an alkyl group and an alkynyl group are bound; a group in which an alkenyl group and an alkynyl group are bound; a group in which one or more of an alkyl group, an alkenyl group, and an alkynyl group, and a cycloalkyl group are bound; a group in which one or more of an alkyl group, an alkenyl group, and an alkynyl group, and an aryl group are bound; and a group in which a cycloalkyl group and an aryl group are bound.

The number of carbon atoms of the monovalent hydrocarbon group is not particularly limited. Specifically, the number of carbon atoms of the alkyl group is, for example, 1 to 10. The number of carbon atoms of the alkenyl group and the number of carbon atoms of the alkynyl group are, for example, 2 to 10. The number of carbon atoms of the cycloalkyl group and the number of carbon atoms of the aryl group are, for example, 6 to 18. This is because the solubility and compatibility of the hetero-unsaturated compound are secured.

Examples of the alkyl group include a methyl group ($-CH_3$), an ethyl group ($-C_2H_5$), a propyl group ($-C_3H_7$), and a t-butyl group ($-C(-CH_3)_2-CH_3$). Examples of the alkenyl group include a vinyl group ($-CH=CH_2$) and an allyl group ($-CH_2-CH=CH_2$). An example of the alkynyl group includes an ethynyl group ($-C\equiv CH$). Examples of the cycloalkyl group include a cyclopropyl group, a cyclobutyl group, a cyclopentyl group, a cyclohexyl group, a cycloheptyl group, and a cyclooctyl group. Examples of the aryl group include a phenyl group and a naphthyl group. An example of the monovalent binding group includes a benzyl group.

The "monovalent halogenated hydrocarbon group" is a generic name of a group in which at least one hydrogen group ($-H$) of the foregoing monovalent hydrocarbon group is substituted (halogenated) by a halogen group. The kind of the halogen group is not particularly limited; however, the halogen group is, for example, one or more of a fluorine group ($-F$), a chlorine group ($-Cl$), a bromine group ($-Br$), an iodine group ($-I$), and the like. Among them, the halogen group is preferably a fluorine group. This is because this makes it possible to improve the chemical stability of the hetero-unsaturated compound.

The monovalent halogenated hydrocarbon group is, for example, a group in which a candidate (such as alkyl group) of the foregoing monovalent hydrocarbon group is halogenated, that is, a group in which at least one hydrogen group of the monovalent hydrocarbon group candidate is substituted by a halogen group. Specific examples of the group in which the monovalent hydrocarbon group candidate is halogenated include a fluoromethyl group ($-CH_2F$), a difluoromethyl group ($-CHF_2$), a trifluoromethyl group ($-CF_3$), and a pentafluoroethyl group ($-C_2F_5$). In particular, a group (perfluoro group) in which all hydrogen groups of the monovalent hydrocarbon group candidate are substituted by a halogen group is more preferable. Examples of the perfluoro group include a perfluoromethyl group ($-CF_3$), a perfluoroethyl group ($-C_2F_5$), a perfluoropropyl group ($-C_3F_7$), and a perfluoro-t-butyl group ($-C(-CF_3)_2-CF_3$).

The "(1+n1)-valent oxygen-containing hydrocarbon group" is a generic name a group having a valence of (1+n1) and constituted of oxygen (O) together with carbon and hydrogen, and a (1+n1) oxygen-containing hydrocarbon group may contain one or more oxygen atoms as a constituent element. The (1+n1)-valent oxygen-containing hydrocarbon group may have a straight-chain structure or a branched structure with one or more side chains. The (1+n1)-valent oxygen-containing hydrocarbon group may include a carbon-carbon multiple bond or may not include a carbon-carbon multiple bond.

An aspect in which the (1+n1)-valent oxygen-containing hydrocarbon group contains oxygen as a constituent element is not particularly limited. Specifically, the (1+n1)-valent oxygen-containing hydrocarbon group contains, for example, oxygen as a constituent element and thus contains one or more of oxygen-containing groups such as an ether group ($-O-$), a carbonyl group ($-C(=O)-$), a hydroxyl group ($-OH$), and an alkoxy group.

The "alkoxy group" is a monovalent group represented by $-O-R$ (R is a monovalent hydrocarbon group). Details regarding the "monovalent hydrocarbon group" are as described above. Examples of the alkoxy group include a methoxy group ($-OCH_3$) and an ethoxy group ($-OC_2H_5$).

R4 is bound to a carbon atom (to which R3 is bound) and n1 cyano groups. Thus, the valence number (1+n1) of the oxygen-containing hydrocarbon group described here is 2 or more.

The configuration of the (1+n1)-valent oxygen-containing hydrocarbon group is not particularly limited. Specifically, the oxygen-containing hydrocarbon group in which (1+n1)=2 is preferably, for example, a divalent group represented by the following chemical formula (4). This is because the hetero-unsaturated compound can sufficiently play the foregoing role.

$-C(=O)-O-R12-$     (4)

(where R12 is one of a divalent hydrocarbon group, a divalent oxygen-containing hydrocarbon group, a divalent halogenated hydrocarbon group, and a divalent halogenated oxygen-containing hydrocarbon group.)

The "divalent hydrocarbon group" is a generic name of a divalent group constituted of carbon and hydrogen. The divalent hydrocarbon group may have a straight-chain structure or a branched structure with one or more side chains. The divalent hydrocarbon group may be an unsaturated hydrocarbon group having a carbon-carbon multiple bond or a saturated hydrocarbon group not having a carbon-carbon multiple bond.

Examples of the divalent hydrocarbon group include an alkylene group, an alkenylene group, an alkynylene group, a cycloalkylene group, an arylene group, and a divalent group in which two or more of them are bound (hereinafter referred to as a "divalent binding group").

Examples of the divalent binding group include divalent groups such as a group in which an alkylene group and an alkenylene group are bound; a group in which an alkylene group and an alkynylene group are bound; a group in which an alkenylene group and an alkynylene group are bound; a group in which one or more of an alkylene group, an alkenylene group, and an alkynylene group, and a cycloalkylene group are bound; a group in which one or more of an alkylene group, an alkenylene group, and an alkynylene group, and an arylene group are bound; and a group in which a cycloalkylene group and an arylene group are bound.

The number of carbon atoms of the divalent hydrocarbon group is not particularly limited. Specifically, the number of carbon atoms of the alkylene group is, for example, 1 to 12. The number of carbon atoms of the alkenylene group and the number of carbon atoms of the alkynylene group are, for example, 2 to 12. The number of carbon atoms of the cycloalkylene group and the number of carbon atoms of the arylene group are, for example, 3 to 18.

Examples of the alkylene group include a methylene group ($-CH_2-$), an ethylene group ($-C_2H_4-$), a propylene group ($-C_3H_6-$), and a t-butylene group ($-C(-CH_3)_2-CH_2-$). Examples of the alkenylene group include a vinylene group ($-CH=CH-$) and an arylene group ($-CH_2-CH=CH-$). An example of the alkynylene group includes an ethynylene group ($-C\equiv C-$). Examples of the cycloalkylene group include a cyclopropylene group, a cyclobutylene group, a cyclopentylene group, a cyclohexylene group, a cycloheptylene group, and a cyclooctylene group. Examples of the arylene group include a phenylene group and a naphthylene group. An example of the divalent binding group includes a benzylene group.

The "divalent oxygen-containing hydrocarbon group" is a generic name of a divalent group constituted of oxygen together with carbon and hydrogen. The divalent oxygen-containing hydrocarbon group may have a straight-chain structure or a branched structure with one or more side chains. The divalent oxygen-containing hydrocarbon group may include a carbon-carbon multiple bond or may not include a carbon-carbon multiple bond.

Although an aspect in which the divalent oxygen-containing hydrocarbon group contains oxygen as a constituent element is not particularly limited, the aspect is, for example, similar to an aspect in which the n1-valent oxygen-containing hydrocarbon group contains oxygen as a constituent element.

An example of the divalent oxygen-containing hydrocarbon group includes —CH(—OCH$_3$)—CH(—CH$_3$)—.

The "divalent halogenated hydrocarbon group" is a generic name of a group in which at least one hydrogen group of the foregoing divalent hydrocarbon group is substituted by a halogen group. Details regarding the halogen group are as described above.

The divalent halogenated hydrocarbon group is, for example, a group in which a candidate (such as alkylene group) of the foregoing divalent hydrocarbon group is halogenated, that is, a group in which at least one hydrogen group of the divalent hydrocarbon group candidate is substituted by a halogen group. Specific examples of the group in which the divalent hydrocarbon group candidate is halogenated include a fluoromethylene group (—CHF—), a difluoromethylene group (—CF$_2$—), and a tetrafluoroethylene group (—C$_2$F$_4$—). In particular, a group (perfluoro group) in which all hydrogen groups of the divalent hydrocarbon group candidate are substituted by a halogen group is more preferable. Examples of the perfluoro group include a perfluoromethylene group (—CF$_2$—), a perfluoroethylene group (—C$_2$F$_4$—), a perfluoropropylene group (—C$_3$F$_6$—), and a perfluoro-t-butylene group (—C(—CF$_3$)$_2$—CF$_2$—).

Details regarding the divalent halogenated hydrocarbon group other than above are the same as the details regarding the monovalent halogenated hydrocarbon group, except that the valence number is different.

The "divalent halogenated oxygen-containing hydrocarbon group" is a generic name of a group in which at least one hydrogen group of the foregoing divalent oxygen-containing hydrocarbon group is substituted by a halogen group. The divalent halogenated oxygen-containing hydrocarbon group is, for example, a group in which a candidate of the foregoing divalent oxygen-containing hydrocarbon group is halogenated, that is, a group in which at least one hydrogen group of the divalent oxygen-containing hydrocarbon group candidate is substituted by a halogen group.

Details regarding the divalent halogenated oxygen-containing hydrocarbon group other than above are the same as the details regarding the monovalent halogenated oxygen-containing hydrocarbon group, except that the valence number is different.

Details regarding each of the "(1+n2)-valent oxygen-containing hydrocarbon group", the "(1+n3)-valent oxygen-containing hydrocarbon group", and the "(1+n3)-valent oxygen-containing hydrocarbon group" are the same as those in the case described for the n1-valent oxygen-containing hydrocarbon group, except that the valence number is different.

The "(1+n1)-valent halogenated oxygen-containing hydrocarbon group" is a generic name of a group in which at least one hydrogen group of the foregoing (1+n1)-valent oxygen-containing hydrocarbon group is substituted by a halogen group. Details regarding the (1+n1)-valent halogenated oxygen-containing hydrocarbon group are the same as the details regarding the monovalent halogenated oxygen-containing hydrocarbon group, except that the valence number is different.

Details regarding each of the "(1+n2)-valent halogenated oxygen-containing hydrocarbon group", the "(1+n3)-valent halogenated oxygen-containing hydrocarbon group", and the "(1+n4)-valent halogenated oxygen-containing hydrocarbon group" are the same as the details regarding the (1+n1)-valent halogenated oxygen-containing hydrocarbon group, except that the valence number is different.

Since n1 is an integer of not less than 1, the compound represented by the chemical formula (1) contains one or more cyano groups. That is, the valence number (1+n1) of R4 is determined according to the number of cyano groups.

Since n2 is an integer of not less than 1, the compound represented by the chemical formula (2) contains one or more cyano groups. That is, the valence number (1+n2) of R7 is determined according to the number of cyano groups.

Since each of n3 and n4 is an integer of not less than 1, the compound represented by the chemical formula (3) contains two or more cyano groups. In this case, the valence number (1+n3) of R10 is determined according to the number of cyano groups bound to R10, and the valence number (1+n4) of R11 is determined according to the number of cyano groups bound to R11.

However, each of R4, R7, R10 and R11 may be omitted according to an embodiment of the present technology.

That is, in the compound represented by the chemical formula (1), when R4 exists, one or more cyano groups (—CN) are indirectly bound to a carbon atom (to which R3 is bound) with R4 interposed therebetween. On the other hand, when R4 does not exist, one or more cyano groups are directly bound to the carbon atom without R4 interposed therebetween.

In the compound represented by the chemical formula (2), when R7 exists, one or more cyano groups are indirectly bound to a carbon atom (to which R6 is bound) with R7 interposed therebetween. On the other hand, when R7 does not exist, one or more cyano groups are directly bound to the carbon atom without R7 interposed therebetween.

In the compound represented by the chemical formula (3), when R10 exists, one or more cyano groups are indirectly bound to a carbon atom (to which R8 is bound) with R10 interposed therebetween, and when R10 does not exist, one or more cyano groups are directly bound to the carbon atom without R10 interposed therebetween. When R11 exists, one or more cyano groups are indirectly bound to a carbon atom (to which R9 is bound) with R11 interposed therebetween, and when R11 does not exist, one or more cyano groups are directly bound to the carbon atom without R11 interposed therebetween.

More specifically, the hetero-unsaturated compound containing the nitrogen-containing group together with the carbon-carbon double bond contains, for example, one or more of compounds represented by the following respective chemical formulas (5) to (9). The compound represented by the chemical formula (5) is acrylonitrile.

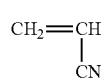

(5)

-continued

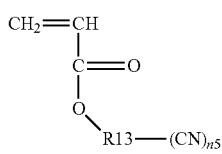 (6)

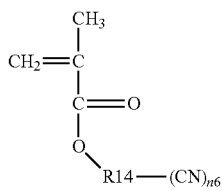 (7)

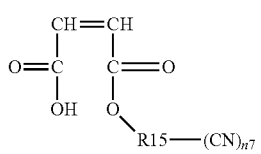 (8)

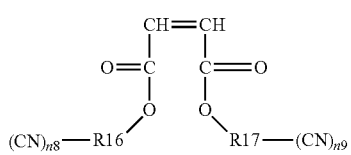 (9)

(where R13 includes one or more of a (1+n5)-valent hydrocarbon group, a (1+n5)-valent oxygen-containing hydrocarbon group, a (1+n5)-valent halogenated hydrocarbon group, and a (1+n5)-valent halogenated oxygen-containing hydrocarbon group. R14 includes one or more of a (1+n6)-valent hydrocarbon group, a (1+n6)-valent oxygen-containing hydrocarbon group, a (1+n6)-valent halogenated hydrocarbon group, and a (1+n6)-valent halogenated oxygen-containing hydrocarbon group. R15 includes one or more of a (1+n7)-valent hydrocarbon group, a (1+n7)-valent oxygen-containing hydrocarbon group, a (1+n7)-valent halogenated hydrocarbon group, and a (1+n7)-valent halogenated oxygen-containing hydrocarbon group. R16 includes one or more of a (1+n8)-valent hydrocarbon group, a (1+n8)-valent oxygen-containing hydrocarbon group, a (1+n8)-valent halogenated hydrocarbon group, and a (1+n8)-valent halogenated oxygen-containing hydrocarbon group. R17 includes one or more of a (1+n9)-valent hydrocarbon group, a (1+n9)-valent oxygen-containing hydrocarbon group, a (1+n9)-valent halogenated hydrocarbon group, and a (1+n9)-valent halogenated oxygen-containing hydrocarbon group. Each of n5 to n9 is an integer of not less than 1.)

Details regarding each of the "(1+n5)-valent hydrocarbon group", the "(1+n6)-valent hydrocarbon group", the "(1+n7)-valent hydrocarbon group", the "(1+n8)-valent hydrocarbon group", and the "(1+n9)-valent hydrocarbon group" are the same as the details regarding the (1+n1)-valent hydrocarbon group, except that the valence number is different.

Details regarding each of the "(1+n5)-valent oxygen-containing hydrocarbon group", the "(1+n6)-valent oxygen-containing hydrocarbon group", the "(1+n7)-valent oxygen-containing hydrocarbon group", the "(1+n8)-valent oxygen-containing hydrocarbon group", and the "(1+n9)-valent oxygen-containing hydrocarbon group" are the same as the details regarding the (1+n1)-valent oxygen-containing hydrocarbon group, except that the valence number is different.

Details regarding each of the "(1+n5)-valent halogenated hydrocarbon group", the "(1+n6)-valent halogenated hydrocarbon group", the "(1+n7)-valent halogenated hydrocarbon group", the "(1+n8)-valent halogenated hydrocarbon group", and the "(1+n9)-valent halogenated hydrocarbon group" are the same as the details regarding the (1+n1)-valent halogenated hydrocarbon group, except that the valence number is different.

Details regarding each of the "(1+n5)-valent halogenated oxygen-containing hydrocarbon group", the "(1+n6)-valent halogenated oxygen-containing hydrocarbon group", the "(1+n7)-valent halogenated oxygen-containing hydrocarbon group", the "(1+n8)-valent halogenated oxygen-containing hydrocarbon group", and the "(1+n9)-valent halogenated oxygen-containing hydrocarbon group" are the same as the details regarding the (1+n1)-valent halogenated oxygen-containing hydrocarbon group, except that the valence number is different.

The compounds represented by the chemical formulas (6) to (9) are, for example, compounds represented by the following respective chemical formulas (6-1) to (6-3) and (7-1):

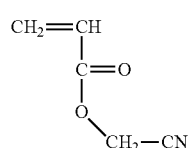 (6-1)

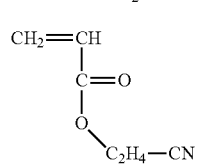 (6-2)

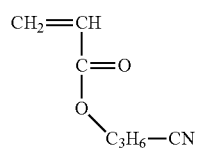 (6-3)

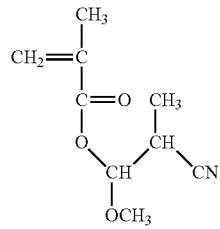 (7-1)

When the hetero-unsaturated compound contains a sulfur atom as a constituent atom, the hetero-unsaturated compound contains one or more of sulfur-containing groups. The "sulfur-containing group" is a generic name of a group containing a sulfur atom as a constituent atom.

The kind of the sulfur-containing group is not particularly limited; however, the sulfur-containing group is, for example, a sulfonic acid group (—SO$_3$H) and a sulfonic acid group derivative represented by the following chemical formula (10):

—SO$_3$—R100 (10)

(where R100 includes one or more of a monovalent hydrocarbon group, a monovalent oxygen-containing hydrocarbon group, a monovalent halogenated hydrocarbon group, and a monovalent halogenated oxygen-containing hydrocarbon group.)

Details regarding each of the "monovalent hydrocarbon group", the "monovalent oxygen-containing hydrocarbon group", the "monovalent halogenated hydrocarbon group", and the "monovalent halogenated oxygen-containing hydrocarbon group" are as described above.

The configuration of the hetero-unsaturated compound containing the sulfur-containing group together with a carbon-carbon double bond is not particularly limited. Specifically, the hetero-unsaturated compound containing the sulfur-containing group together with the carbon-carbon double bond contains, for example, one or more of compounds represented by the following respective chemical formulas (11) to (13). The compounds represented by the chemical formulas (11) to (13) contain a sulfonic acid group derivative as the sulfur-containing group.

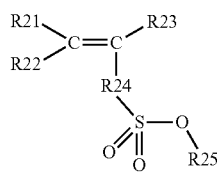

(11)

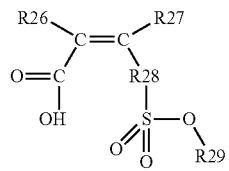

(12)

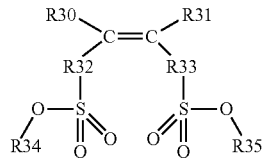

(13)

(where each of R21 to R23, R25 to R27, R29 to R31, R34, and R35 includes one or more of a hydrogen group, a monovalent hydrocarbon group, and a monovalent halogenated hydrocarbon group. Each of R24, R28, R32 and R33 is one of a divalent oxygen-containing hydrocarbon group and a divalent halogenated oxygen-containing hydrocarbon group. However, each of R24, R28, R32 and R33 may be omitted according to an embodiment of the present technology.)

Details regarding each of the "monovalent hydrocarbon group", the "monovalent halogenated hydrocarbon group", the "divalent oxygen-containing hydrocarbon group", and the "divalent halogenated oxygen-containing hydrocarbon group" are as described above.

The compound represented by the chemical formula (11) contains one sulfonic acid group derivative (—SO$_3$—R25). The compound represented by the chemical formula (12) contains one sulfonic acid group derivative (—SO$_3$—R29). The compound represented by the chemical formula (13) contains two sulfonic acid group derivatives (—SO$_3$—R34 and —SO$_3$—R35).

However, each of R24, R28, R32 and R33 may be omitted.

That is, in the compound represented by the chemical formula (11), when R24 exists, the sulfonic acid group derivative (—SO$_3$—R25) is indirectly bound to a carbon atom (to which R23 is bound) with R24 interposed therebetween. On the other hand, when R24 does not exist, the sulfonic acid group derivative (—SO$_3$—R25) is directly bound to the carbon atom without R24 interposed therebetween.

In the compound represented by the chemical formula (12), when R28 exists, the sulfonic acid group derivative (—SO$_3$—R29) is indirectly bound to a carbon atom (to which R27 is bound) with R28 interposed therebetween. On the other hand, when R28 does not exist, the sulfonic acid group derivative (—SO$_3$—R29) is directly bound to the carbon atom without R28 interposed therebetween.

In the compound represented by the chemical formula (13), when R32 exists, the sulfonic acid group derivative (—SO$_3$—R34) is indirectly bound to a carbon atom (to which R30 is bound) with R32 interposed therebetween, and when R32 does not exist, the sulfonic acid group derivative (—SO$_3$—R34) is directly bound to the carbon atom without R32 interposed therebetween. When R33 exists, the sulfonic acid group derivative (—SO$_3$—R35) is indirectly bound to a carbon atom (to which R31 is bound) with R33 interposed therebetween, and when R33 does not exist, the sulfonic acid group derivative (—SO$_3$—R35) is directly bound to the carbon atom without R33 interposed therebetween.

More specifically, the hetero-unsaturated compound containing the sulfur-containing group together with the carbon-carbon double bond contains, for example, one or more of compounds represented by the following respective chemical formulas (14) to (18):

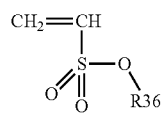

(14)

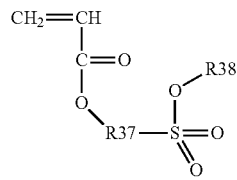

(15)

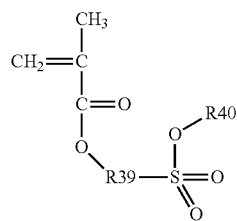

(16)

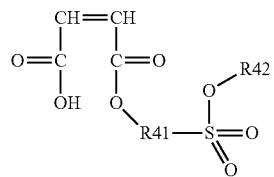

(17)

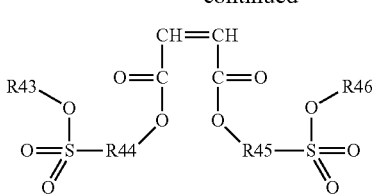

(18)

(where each of R36, R38, R40, R42, R43 and R46 includes one or more of a hydrogen group, a monovalent hydrocarbon group, and a monovalent halogenated hydrocarbon group. Each of R37, R39, R41, R44 and R45 includes one or more of a divalent oxygen-containing hydrocarbon group and a divalent halogenated oxygen-containing hydrocarbon group.)

Details regarding each of the "monovalent hydrocarbon group", the "monovalent halogenated hydrocarbon group", the "divalent oxygen-containing hydrocarbon group", and the "divalent halogenated oxygen-containing hydrocarbon group" are as described above.

The compounds represented by the chemical formulas (14) to (18) are, for example, compounds represented by the following respective chemical formulas (14-1), (14-2), (16-1), and (16-2):

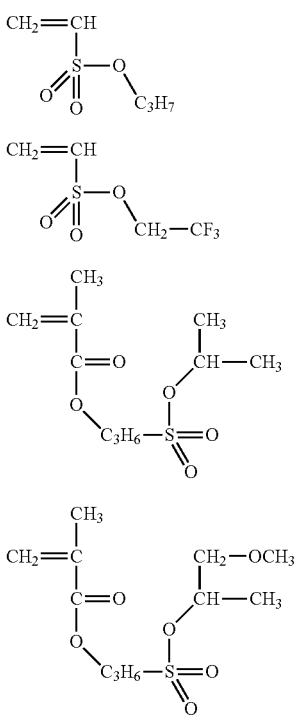

When the hetero-unsaturated compound contains a phosphorus atom as a constituent atom, the hetero-unsaturated compound contains one or more of phosphorus-containing groups. The "phosphorus-containing group" is a generic name of a group containing a phosphorus atom as a constituent atom.

The kind of the phosphorus-containing group is not particularly limited; however, the phosphorus-containing group is, for example, a phosphate group (—$H_2PO_4$) and a phosphate group derivative represented by the chemical following formula (19):

—$R101R102_2PO_4$ (19)

(where each of R101 and R102 includes one or more of a monovalent hydrocarbon group, a monovalent oxygen-containing hydrocarbon group, a monovalent halogenated hydrocarbon group, and a monovalent halogenated oxygen-containing hydrocarbon group.)

Details regarding each of the "monovalent hydrocarbon group", the "monovalent halogenated hydrocarbon group", the "monovalent oxygen-containing hydrocarbon group", and the "monovalent halogenated oxygen-containing hydrocarbon group" are as described above.

The configuration of the hetero-unsaturated compound containing the phosphorus-containing group together with a carbon-carbon double bond is not particularly limited. Specifically, the hetero-unsaturated compound containing the phosphorus-containing group together with the carbon-carbon double bond contains, for example, one or more of compounds represented by the following respective chemical formulas (20) to (22). The compounds represented by the chemical formulas (20) to (22) contain a phosphate group derivative as the phosphorus-containing group.

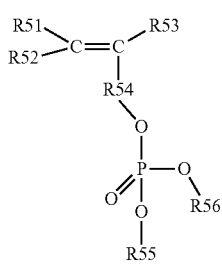

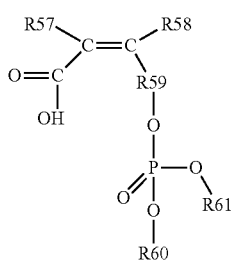

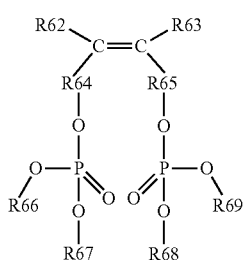

(where each of R51 to R53, R55 to R58, R60 to R63, and R66 to R69 includes one or more of a hydrogen group, a monovalent hydrocarbon group, and a monovalent halogenated hydrocarbon group. Each of R54, R59, R64 and R65 includes one or more of a divalent oxygen-containing hydrocarbon group and a divalent halogenated oxygen-containing hydrocarbon group. However, each of R54, R59, R64 and R65 may be omitted according to an embodiment.)

Details regarding each of the "monovalent hydrocarbon group", the "monovalent halogenated hydrocarbon group", the "divalent oxygen-containing hydrocarbon group", and the "divalent halogenated oxygen-containing hydrocarbon group" are as described above.

The compound represented by the chemical formula (20) contains one phosphate group derivative (—R55R56PO$_4$). The compound represented by the chemical formula (21) contains one phosphate group derivative (—R60R61PO$_4$). The compound represented by the chemical formula (22) contains two phosphate group derivatives (—R66R67PO$_4$ and —R68R69PO$_4$).

However, each of R54, R59, R64 and R65 may be omitted according to an embodiment.

That is, in the compound represented by the formula (20), when R54 exists, the phosphate group derivative (—R55R56PO$_4$) is indirectly bound to a carbon atom (to which R53 is bound) with R54 interposed therebetween. On the other hand, when R54 does not exist, the phosphate group derivative (—R55R56PO$_4$) is directly bound to the carbon atom without R54 interposed therebetween.

In the compound represented by the chemical formula (21), when R59 exists, the phosphate group derivative (—R60R61PO$_4$) is indirectly bound to a carbon atom (to which R58 is bound) with R59 interposed therebetween. On the other hand, when R59 does not exist, the phosphate group derivative (—R60R61PO$_4$) is directly bound to the carbon atom without R59 interposed therebetween.

In the compound represented by the chemical formula (22), when R64 exists, the phosphate group derivative (—R66R67PO$_4$) is indirectly bound to a carbon atom (to which R62 is bound) with R64 interposed therebetween, and when R64 does not exist, the phosphate group derivative (—R66R67PO$_4$) is directly bound to the carbon atom without R64 interposed therebetween. When R65 exists, the phosphate group derivative (—R68R69PO$_4$) is indirectly bound to a carbon atom (to which R63 is bound) with R65 interposed therebetween, and when R65 does not exist, the phosphate group derivative (—R68R69PO$_4$) is directly bound to the carbon atom without R65 interposed therebetween.

More specifically, the hetero-unsaturated compound containing the phosphorus-containing group together with the carbon-carbon double bond contains, for example, one or more of compounds represented by the following respective chemical formulas (23) to (27):

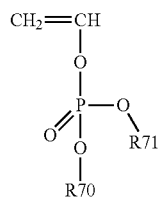
(23)

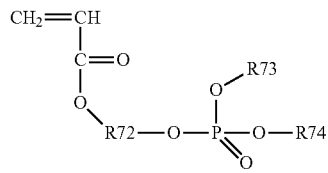
(24)

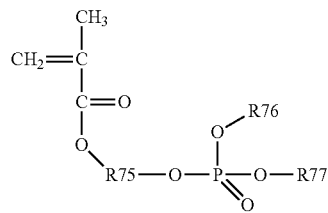
(25)

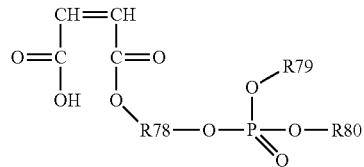
(26)

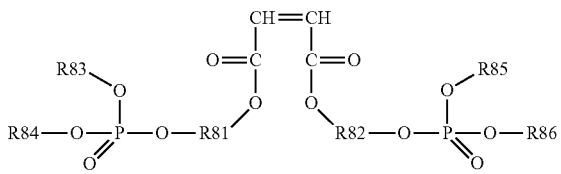
(27)

(where each of R70, R71, R73, R74, R76, R77, R79, R80, and R83 to R86 includes one or more of a hydrogen group, a monovalent hydrocarbon group, and a monovalent halogenated hydrocarbon group. Each of R72, R75, R78, R81 and R82 includes one or more of a divalent oxygen-containing hydrocarbon group and a divalent halogenated oxygen-containing hydrocarbon group.)

Details regarding each of the "monovalent hydrocarbon group", the "monovalent halogenated hydrocarbon group", the "divalent oxygen-containing hydrocarbon group", and the "divalent halogenated oxygen-containing hydrocarbon group" are as described above.

The compounds represented by the chemical formulas (23) to (27) are, for example, compounds represented by the following respective chemical formulas (23-1) to (23-2) and (24-1):

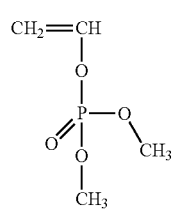
(23-1)

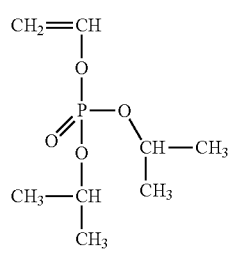
(23-2)

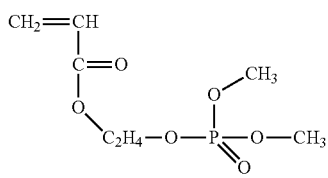
(24-1)

In order to examine the composition of the specific copolymer, for example, the following method may be used. First, the electrolyte layer 16 is taken out by disassembling the secondary battery. Subsequently, the polymer compound (specific copolymer) is extracted from the electrolyte layer 16 by a reprecipitation method. Finally, the specific copolymer is analyzed using an analysis method such as a nuclear magnetic resonance (NMR) method. This makes it possible to specify the composition of the specific copolymer. That is, it is possible to specify three kinds of compounds (monomers) contained as components in the specific copolymer and to specify the copolymerization amount of each component in the specific copolymer.

The specific copolymer may further contain one or more of other components. The "other components" are components other than the foregoing three kinds of compounds (vinylidene fluoride, hexafluoropropylene, and the hetero-unsaturated compound).

The kind of the other components is not particularly limited as long as the other components are compounds including an unsaturated bond for polymerization reaction. Specific examples of the other components include monomethyl maleate, trifluoroethylene, tetrafluoroethylene, and chlorotrifluoroethylene. This is because higher ionic conductivity is obtained in the electrolyte layer 16, and, at the same time, the physical strength of the electrolyte layer 16 is further improved. The respective copolymerization amounts of monomethyl maleate, trifluoroethylene, tetrafluoroethylene, and chlorotrifluoroethylene in the specific copolymer are not particularly limited.

The polymer compound may contain one or more of other polymers together with the foregoing specific copolymer. The other polymers are polymers not containing the foregoing three kinds of compounds (vinylidene fluoride, hexafluoropropylene, and the hetero-unsaturated compound), and may be homopolymers or copolymers.

Examples of the homopolymer include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethylmethacrylate, polyacrylic acid, polymethacrylic acid, styrene-butadiene rubber, nitrile-butadiene rubber, polystyrene, and polycarbonate.

Examples of the copolymer include copolymers such as a copolymer containing vinylidene fluoride and hexafluoropropylene as components, a copolymer containing vinylidene fluoride and a hetero-unsaturated compound as components, and a copolymer containing vinylidene fluoride and monomethyl maleate as components.

The electrolytic solution contains a solvent and an electrolyte salt. However, the electrolytic solution may further contain one or more of other materials such as additives.

The solvent contains one or more of nonaqueous solvents such as organic solvents. The electrolytic solution containing the nonaqueous solvent is a so-called nonaqueous electrolytic solution.

Examples of the nonaqueous solvent include carbonate esters (cyclic carbonate ester and chain carbonate ester), lactone, a chain carboxylic ester, and nitrile. The nonaqueous solvents make it possible to achieve, for example, superior battery capacity, superior cycle characteristics, and superior storage characteristics. Example of the cyclic carbonate esters include ethylene carbonate, propylene carbonate, and butylene carbonate, and examples of the chain carbonate esters include dimethyl carbonate, diethyl carbonate, ethyl methyl carbonate, and methyl propyl carbonate. Examples of the lactone include γ-butyrolactone and γ-valerolactone. Examples of the carboxylic ester include methyl acetate, ethyl acetate, methyl propionate, ethyl propionate, methyl butyrate, methyl isobutyrate, methyl trimethylacetate, and ethyl trimethylacetate. Examples of the nitrile include acetonitrile, glutaronitrile, adiponitrile, methoxyacetonitrile, and 3-methoxypropionitrile.

Other than the materials mentioned above, examples of the nonaqueous solvent include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. These nonaqueous solvents make it possible to achieve similar advantages.

In particular, one or more of ethylene carbonate, propylene carbonate, dimethyl carbonate, diethyl carbonate, and ethyl methyl carbonate are preferable. These materials make it possible to achieve, for example, further superior battery capacity, further superior cycle characteristics, and further superior storage characteristics. In this case, a combination of a high-viscosity (high dielectric constant) solvent (having, for example, specific dielectric constant c 30) such as ethylene carbonate and propylene carbonate and a low-viscosity solvent (having, for example, viscosity 1 mPa·s) such as dimethyl carbonate, ethylmethyl carbonate, and diethyl carbonate is more preferable. The combination makes it possible to improve the dissociation property of the electrolyte salt and ion mobility.

In particular, the solvent may contain one or more of an unsaturated cyclic carbonate ester, a halogenated carbonate ester, a sulfonate ester, an acid anhydride, a dicyano compound (dinitrile compound), a diisocyanate compound, a phosphoric ester, a chain compound having a carbon-carbon triple bond, and the like. This makes it possible to improve the chemical stability of the electrolytic solution.

An unsaturated cyclic carbonate ester is a cyclic carbonate ester including one or more unsaturated bonds (carbon-carbon double bonds or carbon-carbon triple bonds). Examples of the unsaturated cyclic carbonate ester include vinylene carbonate, vinyl ethylene carbonate, and methylene ethylene carbonate. A content of the unsaturated cyclic carbonate ester in the solvent is not particularly limited; however, the content is, for example, from 0.01 wt % to 10 wt %.

The halogenated carbonate ester is a cyclic carbonate ester having one or more halogens as constituent elements or a chain carbonate ester having one or more halogens as constituent elements. Examples of the cyclic halogenated carbonate ester include 4-fluoro-1,3-dioxolan-2-one and 4,5-difluoro-1,3-dioxolan-2-one. Examples of the chain halogenated carbonate ester include fluoromethyl methyl carbonate, bis(fluoromethyl) carbonate, and difluoromethyl methyl carbonate. A content of the halogenated carbonate ester in the solvent is not particularly limited; however, the content is, for example, from 0.01 wt % to 50 wt %.

Examples of the sulfonate ester include 1,3-propane sultone and 1,3-propene sultone. A content of the sulfonate ester in the solvent is not particularly limited; however, the content is, for example, from 0.5 wt % to 5 wt %.

Examples of the acid anhydride include carboxylic anhydride, disulfonic anhydride, and carboxylic-sulfonic anhydride. Examples of the carboxylic anhydride include succinic anhydride, glutaric anhydride, and maleic anhydride. Examples of the disulfonic anhydride include ethanedisulfonic anhydride and propanedisulfonic anhydride. Examples of the carboxylic-sulfonic anhydride include sulfobenzoic anhydride, sulfopropionic anhydride, and sulfobutyric anhydride. A content of the acid anhydride in the solvent is not particularly limited; however, the content is, for example, from 0.5 wt % to 5 wt %.

Examples of the dinitrile compound include a compound represented by $NC-C_mH_{2m}-CN$ (m is an integer of not less than 1). Examples of the dinitrile compound include succinonitrile ($NC-C_2H_4-CN$), glutaronitrile ($NC-C_3H_6-CN$), adiponitrile ($NC-C_4H_8-CN$), and phthalonitrile ($NC-C_6H_4-CN$). A content of the dinitrile compound in the solvent is not particularly limited; however, the content is, for example, from 0.5 wt % to 5 wt %.

Examples of the diisocyanate compound include a compound represented by $OCN-C_nH_{2n}-NCO$ (n is an integer of not less than 1). Examples of the diisocyanate compound include hexamethylene diisocyanate ($OCN-C_6H_{12}-NCO$). A content of the diisocyanate compound in the solvent is not particularly limited; however, the content is, for example, from 0.5 wt % to 5 wt %.

Examples of the phosphoric ester include trimethyl phosphate and triethyl phosphate. A content of the phosphoric ester in the solvent is not particularly limited; however, the content is, for example, from 0.5 wt % to 5 wt %.

The chain compound having a carbon-carbon triple bond is a chain compound having one or more carbon-carbon triple bonds ($-C\equiv C-$). Examples of the chain compound having a carbon-carbon triple bond include propargyl methyl carbonate ($CH\equiv C-CH_2-O-C(=O)-O-CH_3$) and propargyl methyl sulfonate ($CH\equiv C-CH_2-O-S(=O)_2-CH_3$). A content of the chain compound having the carbon-carbon triple bond in the solvent is not particularly limited; however, the content is, for example, from 0.5 wt % to 5 wt %.

The electrolyte salt contains, for example, one or more of salts such as lithium salts. However, the electrolyte salt may contain a salt other than the lithium salt. Examples of the salt other than the lithium salt include a light metal salt other than lithium.

Examples of the lithium salts include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). The nonaqueous solvents make it possible to achieve, for example, superior battery capacity, superior cycle characteristics, and superior storage characteristics.

In particular, one or more of lithium hexafluorophosphate, lithium tetrafluoroborate, lithium perchlorate, and lithium hexafluoroarsenate are preferable, and lithium hexafluorophosphate is more preferable. These lithium salts make it possible to lower internal resistance, thereby achieving a higher effect.

A content of the electrolyte salt is not particularly limited; however, the content is preferably from 0.3 mol/kg to 3.0 mol/kg with respect to the solvent. High ion conductivity is achievable in this range.

The electrolyte layer 16 may further include one or more of other materials.

The other materials include, for example, one or more of a plurality of inorganic particles. The plurality of inorganic particles mainly play a role of improving the safety of the secondary battery. Specifically, when the electrolyte layer 16 includes the plurality of inorganic particles, the separator 15 is less likely to be oxidized during charging and discharging of the secondary battery. Accordingly, short circuit tends not to occur between the positive electrode 13 and the negative electrode 14, so that the safety of the secondary battery is improved.

The kind of the plurality of inorganic particles is not particularly limited. Specifically, the plurality of inorganic particles contain, for example, one or more of inorganic materials such as a ceramic (insulating material). Examples of the ceramic include aluminum oxide ($Al_2O_3$), zirconium oxide ($ZrO_2$), titanium oxide ($TiO_2$), and magnesium oxide ($MgO_2$). This is because oxidation of the separator 15 is sufficiently suppressed, so that occurrence of short circuit is sufficiently suppressed.

The average particle diameter (median diameter D50) and specific surface area (BET specific surface area) of the plurality of inorganic particles are not particularly limited. Specifically, the average particle diameter is, for example, 0.1 μm to 2.5 μm. The specific surface area is, for example, 0.5 $m^2$/g to 11 $m^2$/g.

A content of the plurality of inorganic particles in the electrolyte layer 16 is not particularly limited and can be arbitrarily set.

The secondary battery operates, for example, as follows.

During charging, when lithium ions are extracted from the positive electrode 13, the lithium ions are inserted in the negative electrode 14 through the electrolyte layer 16. On the other hand, during discharging, when lithium ions are extracted from the negative electrode 14, the lithium ions are inserted in the positive electrode 13 through the electrolyte layer 16.

The secondary battery including the electrolyte layer 16 is manufactured, for example, by one of the following three procedures.

In the first procedure, first, the positive electrode 13 is fabricated, and the negative electrode 14 is fabricated.

When fabricating the positive electrode 13, first, the positive electrode active material is mixed with the positive electrode binder, the positive electrode conductive agent, and the like to obtain a positive electrode mixture. Subsequently, the positive electrode mixture is dispersed or dissolved in, for example, an organic solvent to obtain a paste-like positive electrode mixture slurry. Finally, both surfaces of the positive electrode current collector 13A are coated with the positive electrode mixture slurry, and thereafter, the coated positive electrode mixture slurry is dried to form the positive electrode active material layer 13B. Thereafter, the positive electrode active material layer 13B may be compression-molded with use of, for example, a roll pressing machine. In this case, the compression molding processing may be performed while heating the positive electrode active material layer 13B, or the compression molding processing may be repeated a plurality of times.

When fabricating the negative electrode 14, the negative electrode active material layers 14B are formed on both surfaces of the negative electrode current collector 14A by the production procedure that is the same as in the positive electrode 13. Specifically, a negative electrode mixture in which the negative electrode active material, the negative electrode binder, and the negative electrode conductive agent are mixed is dispersed or dissolved in, for example, an organic solvent to obtain a paste-like negative electrode mixture slurry. Subsequently, the negative electrode mixture slurry is coated on both surfaces of the negative electrode current collector 14A and then dried to form the negative electrode active material layer 14B, and then, if necessary, the negative electrode active material layer 14B is compression-molded with use of, for example, a roll pressing machine.

Subsequently, after an electrolytic solution, a polymer compound including the foregoing specific copolymer, optionally a plurality of inorganic particles, a diluting solvent (for example, an organic solvent) and the like are mixed, the mixture is stirred, whereby a sol precursor solution is prepared.

In the case of obtaining the specific copolymer, for example, a raw material containing three kinds of monomers (vinylidene fluoride, hexafluoropropylene, and the hetero-unsaturated compound) is used and subjected to polymerization reaction. This provides the specific copolymer containing vinylidene fluoride, hexafluoropropylene, and the hetero-unsaturated compound as components. In this case, the copolymerization amount of each component in the specific copolymer can be adjusted according to an input amount of each raw material.

Subsequently, the surface of the positive electrode 13 is coated with the precursor solution, and the coated precursor solution is dried to form the gel electrolyte layer 16. On the other hand, the surface of the negative electrode 14 is coated with the precursor solution, and the coated precursor solution is dried to form the gel electrolyte layer 16. Subsequently, the positive electrode lead 11 is attached to the positive electrode current collector 13A by, for example, a welding method, and the negative electrode lead 12 is attached to the negative electrode current collector 14A by, for example, a welding method. Subsequently, the positive electrode 13 and the negative electrode 14 stacked with the separator 15 and the electrolyte layer 16 interposed therebetween are spirally wound to fabricate the spirally wound electrode body 10. Subsequently, the protective tape 17 is attached onto the outermost periphery of the spirally wound electrode body 10. Subsequently, the outer package member 20 is folded to interpose the spirally wound electrode body 10, and thereafter, the outer edges of the outer package member 20 are bonded by, for example, a thermal fusion bonding method to enclose the spirally wound electrode body 10 in the outer package member 20. In this case, the close-contact film 21 is inserted between the positive electrode lead 11 and the outer package member 20, and the close-contact film 21 is inserted between the negative electrode lead 12 and the outer package member 20.

In the second procedure, the positive electrode lead 11 is attached to the positive electrode 13, and the negative electrode lead 12 is attached to the negative electrode 14. Subsequently, the positive electrode 13 and the negative electrode 14 stacked with the separator 15 interposed therebetween are spirally wound to fabricate a spirally wound body as a precursor of the spirally wound electrode body 10. Subsequently, the protective tape 17 is attached onto the outermost periphery. Subsequently, the outer package member 20 is folded to interpose the spirally wound body, and thereafter, the outer edges of the outer package member 20 are bonded by, for example, a thermal fusion bonding method to store the spirally wound body in the outer package member 20. Subsequently, the electrolytic solution, a raw material of a polymer compound (including three kinds of monomers which are raw materials of the specific copolymer), a polymerization initiator, and, as necessary, other materials such as a plurality of inorganic particles and a polymerization inhibitor are mixed to prepare a composition for electrolyte. Subsequently, the composition for electrolyte is injected into the pouch-like outer package member 20, and thereafter, the pouch-like outer package member 20 is hermetically sealed by, for example, a thermal fusion bonding method. Subsequently, a polymer compound containing a specific copolymer is formed by thermally polymerizing the raw material of the polymer compound. Accordingly, the polymer compound is impregnated with the electrolytic solution, and the polymer compound is gelated, thus forming the electrolyte layer 16.

In the third procedure, a spirally wound body is fabricated by the same procedure as in the foregoing second procedure, and is then contained inside the pouch-like outer package member 20, except that the separator 15 having on its both sides the polymer compound layers including the specific copolymer is used. When the polymer compound layer is formed, a solution prepared by dissolving the polymer compound including the specific copolymer in an organic solvent or the like is applied to both surfaces of the separator 15, and then the solution is dried. Subsequently, the electrolytic solution is injected into the outer package member 20, and thereafter, a cavity of the outer package member 20 is hermetically sealed by, for example, a thermal fusion bonding method. Subsequently, the outer package member 20 is heated while a weight is applied to the outer package member 20 to bring the separator 15 into close contact with the positive electrode 13 and the negative electrode 14 with the polymer compound layer interposed therebetween. Accordingly, the polymer compound in the polymer compound layer is impregnated with the electrolytic solution, and the polymer compound is gelated, thus forming the electrolyte layer 16.

In the third procedure, swollenness of the secondary battery is suppressed as compared with the first procedure. Further, in the third procedure, a monomer, a solvent, or the like as the raw material of the polymer compound is hardly left in the electrolyte layer 16, as compared with the second procedure, and therefore, the formation process of the polymer compound is favorably controlled. Thus, the positive electrode 13, the negative electrode 14, the separator 15, and the electrolyte layer 16 are in sufficiently close contact with each other.

According to an embodiment, the polymer compound contained in the electrolyte layer 16 includes the specific copolymer.

In this case, as described above, high ionic conductivity is obtained in the electrolyte layer 16, and the physical strength of the electrolyte layer 16 is secured, so that even if the secondary battery is charged and discharged under severe conditions such as a low temperature environment, the discharge capacity is unlikely to decrease. Thus, excellent battery characteristics can be obtained.

In particular, in the case where the heteroatom is a nitrogen atom, a sulfur atom, a phosphorus atom, or the like, the hetero-unsaturated compound can sufficiently play its essential role, so that a higher effect can be obtained.

Further, in the case where the heteroatom is a nitrogen atom, when the hetero-unsaturated compound contains a cyano group or the like, a higher effect can be obtained. In this case, even higher effects can be obtained when the hetero-unsaturated compound is the compound represented by each of the chemical formulas (1) to (3) or the like.

Alternatively, in the case where the heteroatom is a sulfur atom, when the hetero-unsaturated compound contains a sulfonic acid group or the like, a higher effect can be obtained. In this case, even higher effects can be obtained when the hetero-unsaturated compound is the compound represented by each of the chemical formulas (11) to (13) or the like.

Alternatively, in the case where the heteroatom is a phosphorus atom, when the hetero-unsaturated compound contains a phosphate group or the like, a higher effect can be obtained. In this case, even higher effects can be obtained when the hetero-unsaturated compound is the compound represented by each of the chemical formulas (20) to (22) or the like.

When the copolymerization amount of vinylidene fluoride is 70 wt % to 98.9 wt %, the copolymerization amount of hexafluoropropylene is 1 wt % to 20 wt %, and the copolymerization amount of the hetero-unsaturated compound is 0.1 wt % to 10 wt %, higher ionic conductivity is obtained in the electrolyte layer 16, and the physical strength of the electrolyte layer 16 is further improved, so that a higher effect can be obtained.

When the specific copolymer contains one or more of monomethyl maleate, trifluoroethylene, tetrafluoroethylene, and chlorotrifluoroethylene as components, higher ionic conductivity is obtained in the electrolyte layer 16, and the physical strength of the electrolyte layer 16 is further improved, so that a higher effect can be obtained.

When the electrolyte layer 16 includes a plurality of inorganic particles, the safety is improved, and therefore, a higher effect can be obtained. In this case, a higher effect can be obtained when the plurality of inorganic particles contain particles of aluminum oxide or the like.

Next, description is given on application examples of the foregoing secondary battery.

Applications of a secondary battery are not particularly limited as long as the secondary battery is applied to a machine, a device, an appliance, an apparatus, a system (collective entity of a plurality of devices and the like), or the like that is capable of using the secondary battery as a driving electric power source, an electric power storage source for electric power accumulation, or the like. The secondary battery used as an electric power source may be a main electric power source, or may be an auxiliary electric power source. The main electric power source is an electric power source used preferentially regardless of the presence or absence of other power sources. The auxiliary electric power source may be, for example, an electric power source used instead of the main electric power source or an electric power source used by being switched from the main electric power source as necessary. When the secondary battery is used as the auxiliary electric power source, the kind of the main electric power source is not limited to the secondary battery.

Examples of applications of the secondary battery include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof include a mobile lifestyle electric appliance such as an electric shaver; a storage device such as a backup electric power source and a memory card; an electric power tool such as an electric drill and an electric saw; a battery pack used as an attachable and detachable electric power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the applications described above.

In particular, the secondary battery is effectively applicable to the battery pack, the electric vehicle, the electric power storage system, the electric power tool, the electronic apparatus, or the like. The reason for this is that since superior battery characteristics are demanded in these applications, performance can be effectively improved with use of the secondary battery of the present technology. The battery pack is an electric power source including the secondary battery. As will be described later, the battery pack may include a single battery or an assembled battery. The electric vehicle is a vehicle that works (runs) with use of the secondary battery as a driving electric power source, and as described above, the electric vehicle may be an automobile (such as a hybrid automobile) including a drive source other than the secondary battery. The electric power storage system is a system including the secondary battery as an electric power storage source. For example, in a home electric power storage system, electric power is accumulated in the secondary battery as an electric power storage source, and therefore, home electric products and the like can be used using the electric power. The electric power tool is a tool in which a movable section (such as a drill) is allowed to move with use of the secondary battery as a driving electric power source. The electronic apparatus is an apparatus executing various functions with use of the secondary battery as a driving electric power source (electric power supply source).

Herein, specific description is given on some application examples of the secondary battery. The configurations of the application examples explained below are merely examples, and may be changed as appropriate.

Figure 3:
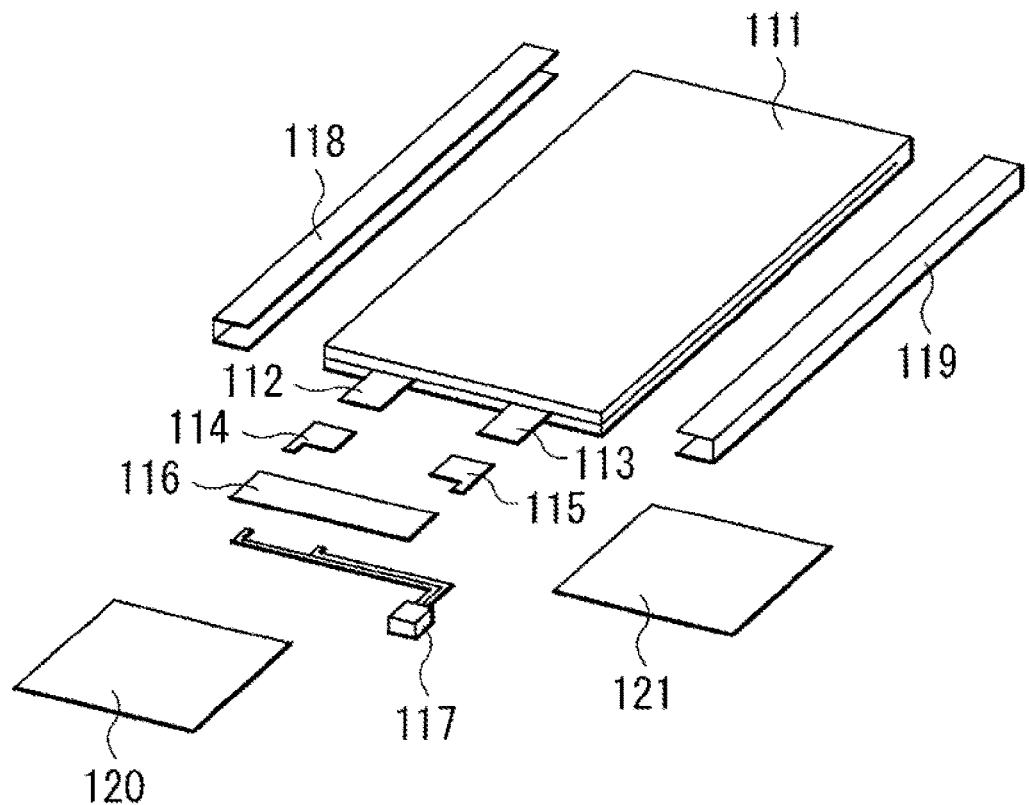
FIG. 3 is a perspective view illustrating a configuration of an application example (a battery pack: single battery) of the secondary battery according to an embodiment of the present technology.
Figure 4:
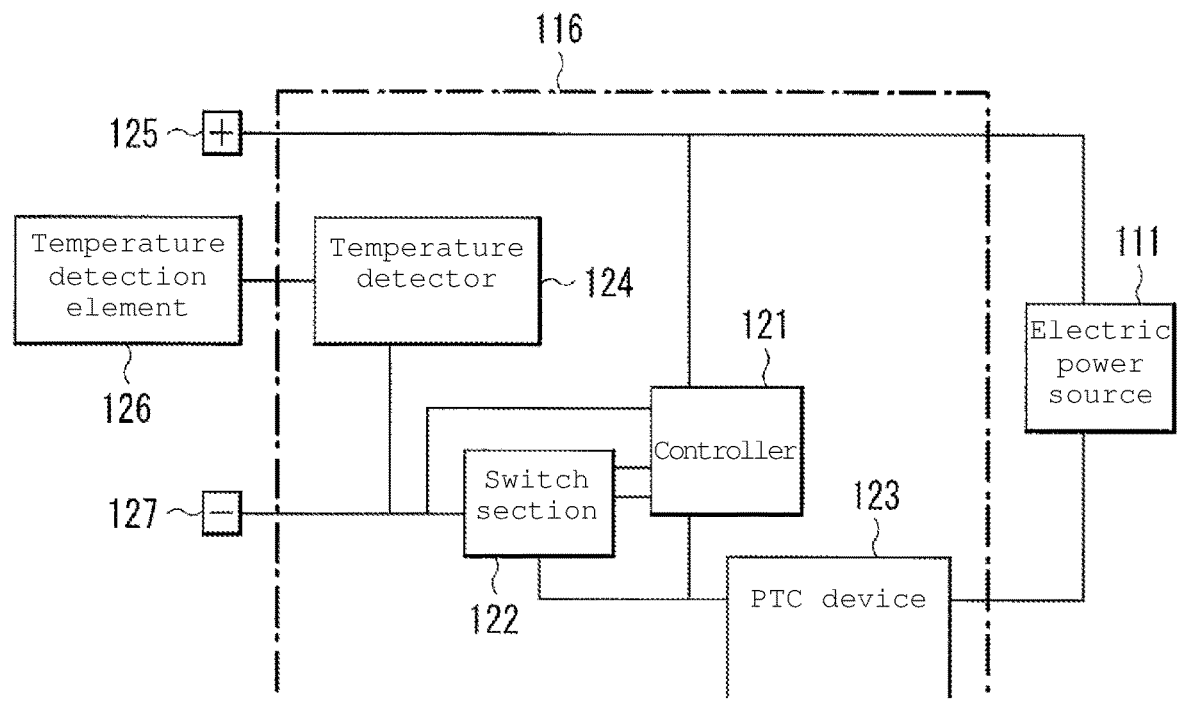
FIG. 4 is a block diagram illustrating a configuration of the battery pack illustrated in FIG. 3.

FIG. 3 illustrates a perspective configuration of a battery pack including a single battery. FIG. 4 illustrates a block configuration of the battery pack shown in FIG. 3. FIG. 3 illustrates a state that the battery pack is disassembled.

The battery back described herein is a simple battery pack including the secondary battery of the present technology (a so-called soft pack), and is mounted in, for example, an electronic apparatus typified by a smartphone. For example, the battery pack includes an electric power source 111 that is a laminated-film-type secondary battery, and a circuit board 116 coupled to the electric power source 111, as illustrated in FIG. 3. A positive electrode lead 112 and a negative electrode lead 113 are attached to the electric power source 111.

A pair of adhesive tapes 118 and 119 is attached to both side surfaces of the electric power source 111. A protection circuit module (PCM) is formed in the circuit board 116. The circuit board 116 is coupled to the positive electrode 112 through a tab 114, and is coupled to a negative electrode lead 113 through a tab 115. Moreover, the circuit board 116 is coupled to a lead 117 provided with a connector for external connection. While the circuit board 116 is coupled to the electric power source 111, the circuit board 116 is protected by a label 120 and an insulating sheet 121. The label 120 is attached to fix, for example, the circuit board 116 and the insulating sheet 121.

Moreover, for example, the battery pack includes the electric power source 111 and the circuit board 116 as illustrated in FIG. 4. The circuit board 116 includes, for example, a controller 121, a switch section 122, a PTC device 123, and a temperature detector 124. The electric power source 111 is allowed to be coupled to outside through a positive electrode terminal 125 and a negative electrode terminal 127, so that the electric power source 111 is charged and discharged through the positive electrode terminal 125 and the negative electrode terminal 127. The temperature detector 124 detects a temperature with use of a temperature detection terminal (a so-called T terminal) 126.

The controller 121 controls an operation of the entire battery pack (including a used state of the electric power source 111). The controller 121 includes, for example, a central processing unit (CPU) or a processor, and a memory.

For example, in the case where a battery voltage reaches an overcharge detection voltage, the controller 121 causes the switch section 122 to be disconnected so that a charge current does not flow into a current path of the electric power source 111. Moreover, for example, in the case where a large current flows during charging, the controller 121 causes the switch section 122 to be disconnected, thereby blocking the charge current.

On the other hand, for example, in the case where a battery voltage reaches an overdischarge detection voltage, the controller 121 causes the switch section 122 to be disconnected so that a discharge current does not flow into a current path of the electric power source 111. Moreover, for example, in the case where a large current flows during discharging, the controller 121 causes the switch section 122 to be disconnected, thereby blocking the discharge current.

The overcharge detection voltage is, for example, 4.2 V±0.05 V, and the overdischarge detection voltage is, for example, 2.4 V±0.1 V.

The switch section 122 switches the used state of the electric power source 111, that is, whether or not the electric power source 111 is allowed to be coupled to an external device in accordance with an instruction from the controller 121. The switch section 122 includes, for example, a charge control switch and a discharge control switch. The charge control switch and the discharge control switch are each, for example, a semiconductor switch such as a field-effect transistor (MOSFET) using a metal oxide semiconductor. Charge and discharge currents are detected based on on-resistance of the switch section 122.

The temperature detector 124 measures a temperature of the electric power source 111, and outputs a measurement result of the temperature to the controller 121. The temperature detector 124 includes, for example, a temperature detection element such as a thermistor. The measurement result of the temperature measured by the temperature detector 124 is used, for example, in the case where the controller 121 performs charge and discharge control at the time of abnormal heat generation and in the case where the controller 121 performs a correction process at the time of calculating remaining capacity.

The circuit board 116 may not include the PTC device 123. In this case, a PTC device may be separately attached to the circuit board 116.

Figure 5:
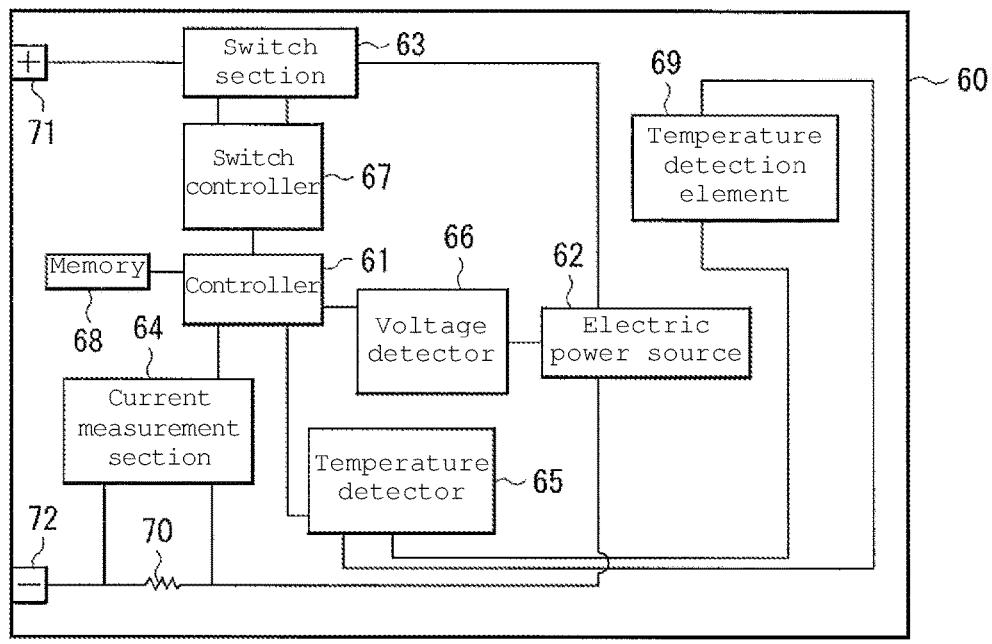
FIG. 5 is a block diagram illustrating a configuration of an application example (a battery pack: assembled battery) of the secondary battery according to an embodiment of the present technology.

FIG. 5 illustrates a block configuration of a battery pack including an assembled battery according to an embodiment.

For example, the battery pack includes a controller 61, an electric power source 62, a switch section 63, a current measurement section 64, a temperature detector 65, a voltage detector 66, a switch controller 67, a memory 68, a temperature detection element 69, a current detection resistance 70, a positive electrode terminal 71, and a negative electrode terminal 72 in a housing 60. The housing 60 contains, for example, a plastic material.

The controller 61 controls an operation of the entire battery pack (including a used state of the electric power source 62). The controller 61 includes, for example, a CPU. The electric power source 62 is an assembled battery including two or more secondary batteries of the present technology, and the two or more secondary batteries may be connected in series, in parallel, or in series-parallel combination. As an example, the electric power source 62 includes six secondary batteries in which two sets of series-connected three batteries are connected in parallel to each other.

The switch section 63 switches the used state of the electric power source 62, that is, whether or not the electric power source 62 is allowed to be coupled to an external device, in accordance with an instruction of the controller 61. The switch section 63 includes, for example, a charge control switch, a discharge control switch, a charging diode, and a discharging diode. The charge control switch and the discharge control switch are each, for example, a semiconductor switch such as a field-effect transistor (MOSFET) using a metal oxide semiconductor.

The current measurement section 64 measures a current with use of the current detection resistance 70, and outputs a measurement result of the current to the controller 61. The temperature detector 65 measures temperature with use of the temperature detection element 69, and outputs a measurement result of the temperature to the controller 61. The measurement result of the temperature is used, for example, in the case where the controller 61 performs charge and discharge control at the time of abnormal heat generation and in the case where the controller 61 performs a correction process at the time of calculating remaining capacity. The voltage detector 66 measures a voltage of the secondary battery in the electric power source 62, performs analog-to-digital conversion on the measured voltages, and supplies the resultant to the controller 61.

The switch controller 67 controls an operation of the switch section 63 in accordance with signals inputted respectively from the current measurement section 64 and the voltage detector 66.

For example, in the case where a battery voltage reaches an overcharge detection voltage, the switch controller 67 causes the switch section 63 (charge control switch) to be disconnected so that a charge current does not flow into a current path of the electric power source 62. This makes it possible to perform only discharge through the discharging diode in the electric power source 62. For example, when a large current flows during charging, the switch controller 67 blocks the charging current.

For example, in the case where a battery voltage reaches an overdischarge detection voltage, the switch controller 67 causes the switch section 63 (discharge control switch) to be disconnected so that a discharge current does not flow into a current path of the electric power source 62. This makes it possible to perform only charge through the charging diode in the electric power source 62. For example, when a large current flows during discharging, the switch controller 67 blocks the discharging current.

The overcharge detection voltage is, for example, 4.2 V±0.05 V, and the overdischarge detection voltage is, for example, 2.4 V±0.1 V.

The memory 68 includes, for example, an EEPROM as a non-volatile memory. The memory 68 holds, for example, numerical values calculated by the controller 61 and information of the secondary battery measured in a manufacturing process (such as an internal resistance in an initial state). In the case where the memory 68 holds full charge capacity of the secondary battery, the controller 61 is allowed to comprehend information such as remaining capacity.

The temperature detection element 69 measures a temperature of the electric power source 62, and outputs a measurement result of the temperature to the controller 61. The temperature detection element 69 includes, for example, a thermistor.

The positive electrode terminal 71 and the negative electrode terminal 72 are terminals coupled to an external device (such as a notebook personal computer) driven using the battery pack or an external device (such as a battery charger) used for charging the battery pack. The electric power source 62 is charged and discharged through the positive electrode terminal 71 and the negative electrode terminal 72.

Figure 6:
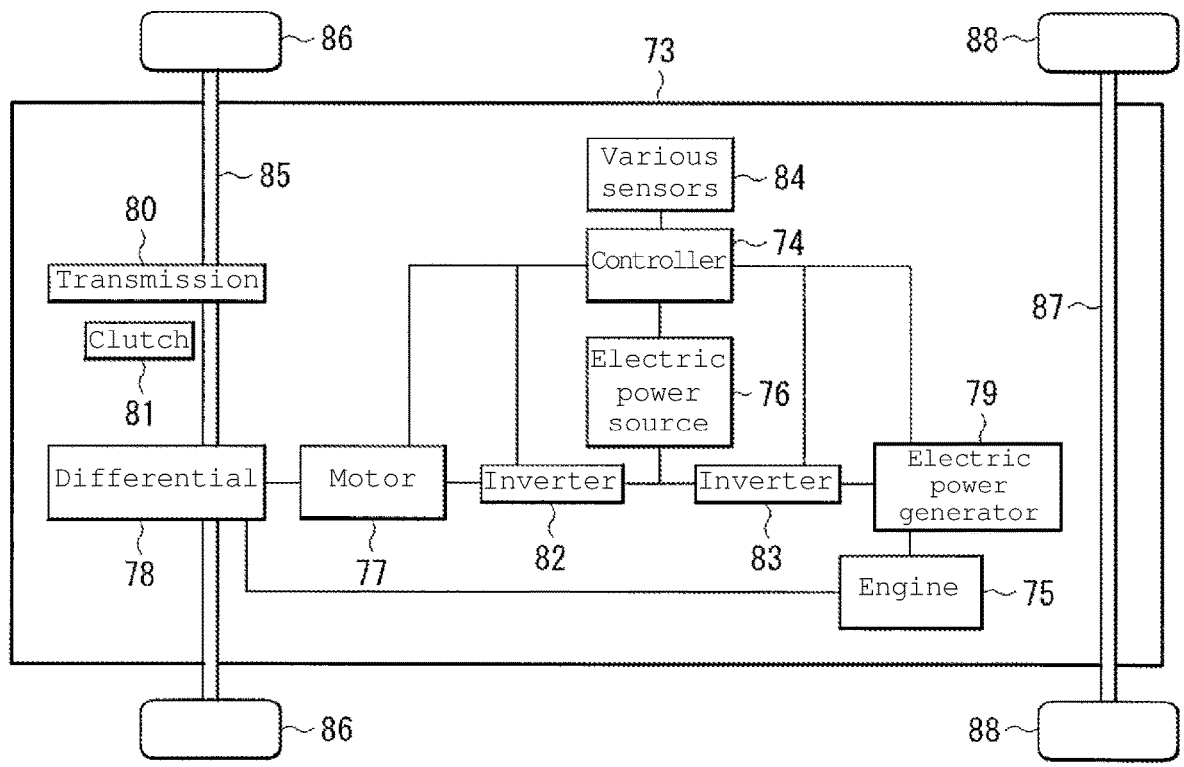
FIG. 6 is a block diagram illustrating a configuration of an application example (an electric vehicle) of the secondary battery according to an embodiment of the present technology.

FIG. 6 illustrates a block configuration of a hybrid automobile as an example of an electric vehicle.

For example, the electric vehicle includes a controller 74, an engine 75, an electric power source 76, a driving motor 77, a differential 78, an electric power generator 79, a transmission 80, a clutch 81, inverters 82 and 83, and various sensors 84 inside a housing 73 made of metal. Other than the components mentioned above, the electric vehicle includes, for example, a front drive shaft 85 and a front tire 86 that are coupled to the differential 78 and the transmission 80, and a rear drive shaft 87, and a rear tire 88.

The electric vehicle can be run with use of one of the engine 75 and the motor 77 as a drive source, for example. The engine 75 is a main power source, and is, for example, a petrol engine. In the case where the engine 75 is used as a power source, drive power (torque) of the engine 75 is transferred to the front tire 86 or the rear tire 88 through the differential 78, the transmission 80, and the clutch 81 as drive sections or driver, for example. Since the torque of the engine 75 is transferred to the electric power generator 79, the electric power generator 79 generates alternating-current electric power with use of the torque, and since the alternating-current electric power is converted into direct-current electric power through the inverter 83, the direct-current electric power is accumulated in the electric power source 76. In contrast, in the case where the motor 77 as a conversion section is used as a power source, electric power (direct-current electric power) supplied from the electric power source 76 is converted into alternating-current electric power through the inverter 82, and therefore, the motor 77 is driven with use of the alternating-current electric power. Drive power (torque) obtained by converting the electric power by the motor 77 is transferred to the front tire 86 and the rear tire 88 through the differential 78, the transmission 80, and the clutch 81 as the drive sections or driver, for example.

When speed of the electric vehicle is reduced by a brake mechanism, resistance at the time of speed reduction is transferred to the motor 77 as torque, and thus the motor 77 may generate alternating-current electric power by utilizing the torque. It is preferable that the alternating-current electric power is converted into direct-current electric power through the inverter 82, and thus the direct-current regenerative electric power be accumulated in the electric power source 76.

The controller 74 controls an operation of the entire electric vehicle. The controller 74 includes, for example, a CPU or a processor. The electric power source 76 includes one or more secondary batteries of the present technology. The electric power source 76 is coupled to an external power source, and the power source 76 is allowed to accumulate electric power by receiving electric power supply from the external electric power source. The various sensors 84 are used, for example, for controlling the number of revolutions of the engine 75 and for controlling opening level (throttle opening level) of a throttle valve. The various sensors 84 include, for example, one or more of a speed sensor, an acceleration sensor, and an engine frequency sensor.

The description has been given above on a case where the electric vehicle is the hybrid automobile; however, the electric vehicle may be a vehicle (an electric automobile) that works with use of only the electric power source 76 and the motor 77 without using the engine 75.

Figure 7:
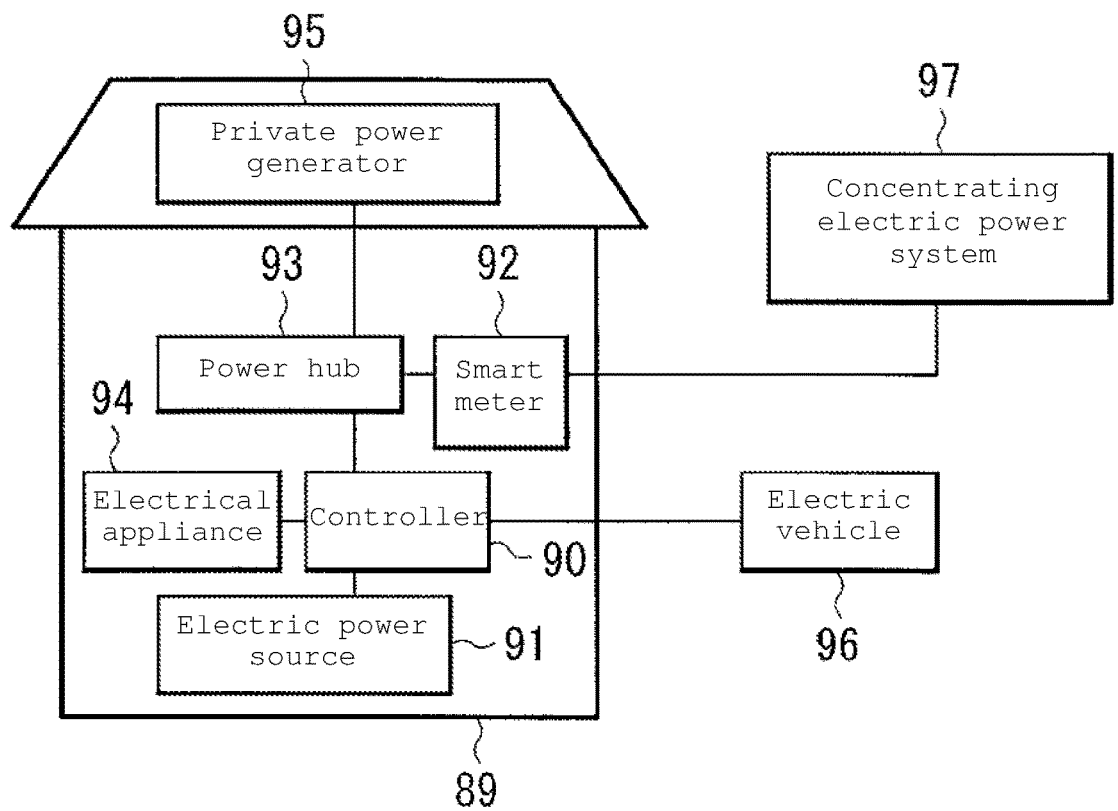
FIG. 7 is a block diagram illustrating a configuration of an application example (an electric power storage system) of the secondary battery according to an embodiment of the present technology.

FIG. 7 illustrates a block configuration of an electric power storage system.

For example, the electric power storage system includes a controller 90, an electric power source 91, a smart meter 92, and a power hub 93 inside a house 89 such as a general residence or a commercial building.

In this case, the electric power source 91 may be coupled to, for example, an electrical appliance 94 provided inside the house 89, and may be allowed to be coupled to an electric vehicle 96 parked outside the house 89. Further, for example, the electric power source 91 may be coupled to a private power generator 95 provided in the house 89 through the power hub 93, and may be allowed to be coupled to an outside concentrating electric power system 97 through the smart meter 92 and the power hub 93.

The electrical appliance 94 includes, for example, one or more home electric products such as a refrigerator, an air conditioner, a television, and a water heater. The private power generator 95 includes, for example, one or more of a solar power generator, a wind-power generator, and the like. The electric vehicle 96 includes, for example, one or more of an electric automobile, an electric motorcycle, a hybrid automobile, and the like. The concentrating electric power system 97 includes, for example, one or more of a thermal power plant, an atomic power plant, a hydraulic power plant, a wind-power plant, and the like.

The controller 90 controls an operation of the entire electric power storage system (including a used state of the electric power source 91). The controller 90 includes, for example, a CPU or a processor. The electric power source 91 includes one or more secondary batteries of the present technology. The smart meter 92 is, for example, an electric power meter that is compatible with a network and is provided in the house 89 demanding electric power, and may be communicable with an electric power supplier. Accordingly, for example, while the smart meter 92 communicates with outside, the smart meter 92 controls the balance between supply and demand in the house 89, which allows for effective and stable energy supply.

In the electric power storage system, for example, electric power may be accumulated in the electric power source 91 from the concentrating electric power system 97 as an external electric power source through the smart meter 92 and the power hub 93, and electric power is accumulated in the electric power source 91 from the private power generator 95 as an independent electric power source through the power hub 93. The electric power accumulated in the electric power source 91 is supplied to the electrical appliance 94 and the electric vehicle 96 in accordance with an instruction from the controller 90, so that the electrical appliance 94 becomes operable, and the electric vehicle 96 becomes chargeable. In other words, the electric power storage system is a system that makes it possible to accumulate and supply electric power in the house 89 with use of the electric power source 91.

The electric power accumulated in the electric power source 91 is usable as required. Thus, for example, electric power is accumulated in the electric power source 91 from the concentrating electric power system 97 in the middle of night when an electric rate is inexpensive, and the electric power accumulated in the electric power source 91 may be used during daytime hours when the electric rate is expensive.

The foregoing electric power storage system may be provided for each household (family unit), or may be provided for a plurality of households (a plurality of family units).

Figure 8:
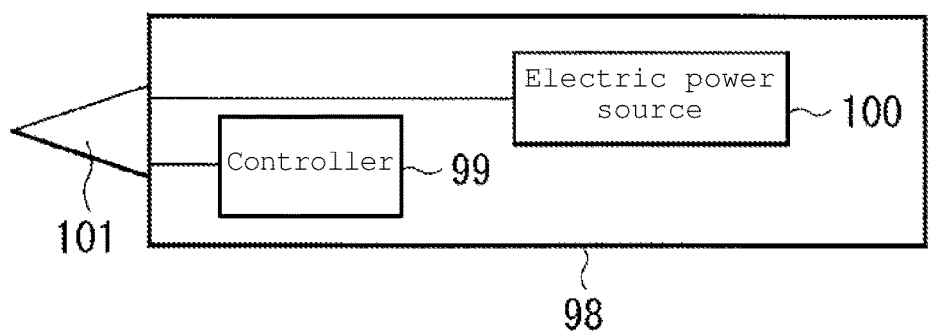
FIG. 8 is a block diagram illustrating a configuration of an application example (an electric power tool) of the secondary battery according to an embodiment of the present technology.

FIG. 8 illustrates a block configuration of an electric power tool according to an embodiment.

The electric power tool described herein is, for example, an electric drill. The electric power tool includes, for example, a controller 99 and an electric power source 100 inside a tool body 98. For example, a drill section 101 as a movable section is attached to the tool body 98 in an operable (rotatable) manner.

The tool body 98 contains, for example, a plastic material. The controller 99 controls an operation of the entire electric power tool (including a used state of the electric power source 100). The controller 99 includes, for example, a CPU. The electric power source 100 includes one or more secondary batteries of the present technology. The controller 99 allows electric power to be supplied from the electric power source 100 to the drill section 101 in accordance with an operation by an operation switch.

EXAMPLES

Examples of the present technology will be described in detail.

Experimental Examples 1-1 to 1-15

Figure 9:
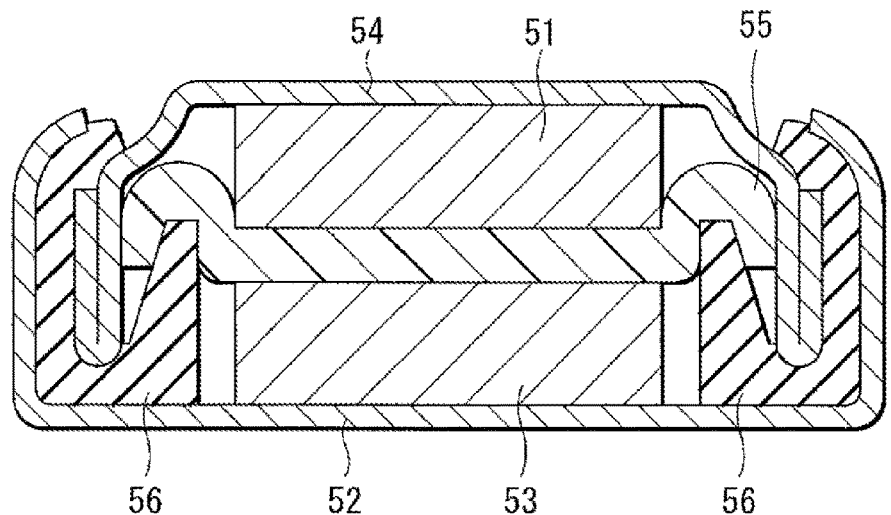
FIG. 9 is a cross-sectional view illustrating a configuration of a test-use secondary battery (coin type) according to an embodiment of the present technology.

A coin type lithium ion secondary battery illustrated in FIG. 9 was fabricated as a test-use secondary battery. In the secondary battery, a test electrode 51 and a counter electrode 53 are stacked with a separator 55 interposed therebetween, and an outer package cup 54 housing the test electrode 51 and an outer package can 52 housing the counter electrode 53 are swaged with a gasket 56.

In the case of fabricating the test electrode 51, first, 98 parts by mass of a positive electrode active material (LiCoO$_2$), 1.2 parts by mass of a positive electrode binder (polyvinylidene fluoride), and 0.8 parts by mass of a positive electrode conductive agent (graphite) were mixed to obtain a positive electrode mixture. Subsequently, the positive electrode mixture was dispersed in an organic solvent (N-methyl-2-pyrrolidone) to obtain a paste-like positive electrode mixture slurry. Subsequently, one surface of a positive electrode current collector (a strip-shaped aluminum foil having a thickness of 12 μm) was coated with the positive electrode mixture slurry with use of a coating apparatus, and thereafter, the positive electrode mixture slurry was dried to form a positive electrode active material layer. In this case, an area density of the positive electrode active material layer was set to 25 mg/cm$^2$. Finally, the positive electrode active material layer was compression-molded with use of a roll pressing machine. In this case, a volume density of the positive electrode active material layer was set to 3.5 g/cm$^3$.

In the case of fabricating the counter electrode 53, 92.5 parts by mass of a negative electrode active material (artificial graphite), 4.5 parts by mass of a negative electrode binder (polyvinylidene fluoride), and 3 parts by mass of a negative electrode conductive agent (vapor grown carbon fiber) were mixed to obtain a negative electrode mixture. Subsequently, the negative electrode mixture was dispersed in an organic solvent (N-methyl-2-pyrrolidone) to obtain a paste-like negative electrode mixture slurry. Subsequently, one surface of a negative electrode current collector (a strip-shaped copper foil having a thickness of 10 μm) was coated with the negative electrode mixture slurry with use of a coating apparatus, and thereafter, the negative electrode mixture slurry was dried to form a negative electrode active material layer. In this case, an area density of the negative electrode active material layer was set to 13 mg/cm$^2$. Finally, the negative electrode active material layer was compression-molded with use of a roll pressing machine. In this case, a volume density of the negative electrode active material layer was set to 1.5 g/cm$^3$.

In the case of forming the electrolyte layer, first, an electrolytic solution was prepared by dissolving an electrolyte salt (LiPF$_6$) in a solvent (ethylene carbonate, propylene carbonate, and dimethyl carbonate). In this case, the composition of the solvent was ethylene carbonate:propylene carbonate:dimethyl carbonate=25:25:50 in weight ratio, and the content of the electrolyte salt in the solvent was set to 1 mol/kg.

Subsequently, 90 parts by mass of the electrolytic solution, 6 parts by mass of the polymer compound (copolymer), and 4 pars by mass of a plurality of inorganic particles (aluminum oxide, median diameter D50=0.5 μm) were mixed, and the mixture was then stirred to prepare a mixture solution.

Details regarding the polymer compound (polymer) are as shown in Table 1. As the hetero-unsaturated compound, a hetero-unsaturated compound containing a nitrogen-containing group (cyano group) was used. As the polymer type (polymerization type), a homopolymer, a copolymer, and a mixture thereof were used. The mixing ratio (weight ratio) of this mixture was set as homopolymer:copolymer=3:97. Vinylidene fluoride (VDF), hexafluoropropylene (HFP), a hetero-unsaturated compound (HUC), and monomethyl maleate (MMM) were used as raw materials (monomers) of the polymer.

Subsequently, the mixture solution was processed with use of a homogenizer to uniformly disperse the polymer compound and the plurality of inorganic particles in the electrolytic solution, and thereafter, the processed mixture solution was stirred while being heated (75° C.). Subsequently, the mixture solution was further stirred (for 30 minutes to 1 hour), thereby obtaining a sol precursor solution. In this case, the precursor solution was stirred until it became colorless. Finally, the surface of the test electrode 51 (positive electrode active material layer) was coated with the precursor solution with use of a coating apparatus, and the coated precursor solution was dried (at 90° C. for 2 minutes) to form an electrolyte layer. Similarly, the surface of the counter electrode 53 (negative electrode active material layer) was coated with the precursor solution with use of a coating apparatus, and the coated precursor solution was dried (at 90° C. for 2 minutes) to form an electrolyte layer. In this case, the coating speed of the precursor solution was set to 20 m/min.

In the case of assembling the secondary battery, first, the test electrode 51 formed with the electrolyte layer was punched into a pellet shape, and thereafter, the test electrode 51 was housed in the outer package cup 54. Subsequently, the counter electrode 53 formed with the electrolyte layer was punched into a pellet shape, and thereafter, the counter electrode 53 was housed in the outer package can 52. Finally, the test electrode 51 housed in the outer package cup 54 and the counter electrode 53 housed in the outer package can 52 were stacked with the separator 55 (porous polyolefin film having a thickness of 7 μm) interposed therebetween, and then, the outer package can 52 and the outer package cup 54 were swaged with the gasket 56. In this case, the electrolyte layer formed on the test electrode 51 and the electrolyte layer formed on the counter electrode 53 faced each other with the separator 55 interposed therebetween.

In order to evaluate battery characteristics of the secondary battery, when capacity deterioration characteristics of the secondary battery were examined, the results shown in Table 1 were obtained. In the case of examining the capacity deterioration characteristics, a deterioration rate was obtained by the following procedure.

First, the secondary battery was charged and discharged (one cycle) in an ambient temperature environment (25° C.) so as to stabilize the battery state of the secondary battery immediately after the fabrication. During charging, the secondary battery was charged at a constant current of 0.2 C until reaching the upper voltage of 4.3 V, and was then discharged at a constant voltage of 4.3 V until the total charge time reached 8 hours. During discharging, the secondary battery was discharged at a constant current of 0.2 C until reaching the final voltage of 3V. "0.2 C" is a value of a current that causes the battery capacity (theoretical capacity) to be completely discharged in 5 hours.

Subsequently, the secondary battery was charged and discharged (one cycle) in a low temperature environment (0° C.) to measure a discharge capacity at the second cycle. During charging, the secondary battery was charged at a constant current of 0.5 C until reaching the upper voltage of 4.3 V, and was further discharged at a constant voltage of 4.3 V until the total charge time reached 3 hours. During discharging, the secondary battery was discharged at a constant current of 0.5 C until reaching the final voltage of 3V. "0.5 C" is a value of a current that causes the battery capacity (theoretical capacity) to be completely discharged in 2 hours.

Subsequently, the secondary battery was repeatedly charged and discharged until the number of cycles reached 100 cycles in the same environment (0° C.) to measure a discharge capacity at the 100th cycle. The charge-discharge conditions were the same as those at the second cycle.

Finally, after the discharge capacity versus the number of cycles was plotted (horizontal axis: the number of cycles, vertical axis: the discharge capacity) based on the discharge capacity at the second cycle and the discharge capacity at the 100th cycle, a slope (deterioration rate) in which the discharge capacity decreased in accordance with an increase in the number of cycles was obtained.

TABLE 1

Heteroatom: Nitrogen atom

| Experimental Example | Polymerization type | Polymer Kind HUC | Composition (wt %) | | | | Deterioration rate |
|---|---|---|---|---|---|---|---|
| | | | VDF | HFP | HUC | MMM | |
| 1-1 | Copolymer | Formula (5) | 91.8 | 8 | 0.2 | — | −3.6 |
| 1-2 | | | 89 | 8 | 3 | — | −3.2 |
| 1-3 | Copolymer | Formula (6-1) | 91.8 | 8 | 0.2 | — | −3.1 |
| 1-4 | | | 89 | 8 | 3 | — | −3.5 |
| 1-5 | Copolymer | Formula (6-2) | 91.8 | 8 | 0.2 | — | −3.0 |
| 1-6 | | | 89 | 8 | 3 | — | −2.9 |
| 1-7 | Copolymer | Formula (6-3) | 91.8 | 8 | 0.2 | — | −3.5 |
| 1-8 | | | 89 | 8 | 3 | — | −3.7 |
| 1-9 | Copolymer | Formula (7-1) | 91.8 | 8 | 0.2 | — | −3.6 |
| 1-10 | | | 89 | 8 | 3 | — | −3.8 |
| 1-11 | Copolymer | — | 92 | 8 | — | — | −3.9 |
| 1-12 | Copolymer | — | 91.8 | 8 | — | 0.2 | −4.1 |
| 1-13 | Copolymer | — | 89 | 8 | — | 3 | −4.0 |
| 1-14 | Homopolymer | Formula (5) | — | — | 100 | — | −5.6 |
| 1-15 | Copolymer + Homopolymer | — Formula (5) | 92 — | 8 — | — 100 | — — | −4.1 |

VDF: vinylidene fluoride,
HFP: hexafluoropropylene,
HUC: hetero-unsaturated compound
MMM: monomethyl maleate The capacity deterioration characteristics of the secondary battery greatly varied depending on the configuration of the polymer compound as will be described later. Hereinafter, the deterioration rate in the case of using a copolymer containing no hetero-unsaturated compound as a component (Experimental Examples 1-11 to 1-13) is used as a comparison reference.

When a homopolymer containing no hetero-unsaturated compound as a component was used (Experimental Example 1-14), the deterioration rate decreased. When the copolymer containing no hetero-unsaturated compound as a component and a homopolymer containing the hetero-unsaturated compound as a component were mixed (Experimental Example 1-15), the deterioration rates were equal to each other.

On the other hand, when a copolymer (specific copolymer) containing vinylidene fluoride, hexafluoropropylene, and a hetero-unsaturated compound as components was used (Experimental Examples 1-1 to 1-10), the deterioration rate increased.

This result shows the following tendencies. If the copolymer does not contain vinylidene fluoride, hexafluoropropylene, and a hetero-unsaturated compound as components, neither the physical strength nor the ion conductivity of the electrolyte layer will be sufficiently high. As a result, when charge and discharge are repeated, the discharge capacity tends to decrease, so that the deterioration rate decreases. On the other hand, when the copolymer contains vinylidene fluoride, hexafluoropropylene, and a hetero-unsaturated compound as components, both the physical strength and the ion conductivity of the electrolyte layer will be sufficiently high. As a result, even when charge and discharge are repeated, the discharge capacity is unlikely to decrease, so that the deterioration rate increases.

Experimental Examples 2-1 to 2-11

As shown in Table 2, a secondary battery was fabricated in the same procedure as in Experimental Examples 1-1 to 1-15, except that a hetero-unsaturated compound containing a sulfur-containing group (sulfonic acid group derivative) was used instead of the hetero-unsaturated compound containing a nitrogen-containing group (cyano group), and the battery characteristics (capacity deterioration characteristics) of the secondary battery were evaluated.

TABLE 2

Heteroatom: Sulfur atom

| Experimental Example | Polymer Kind | | Composition (wt %) | | | Deterioration rate |
|---|---|---|---|---|---|---|
| | Polymerization type | HUC | VDF | HFP | HUC | |
| 2-1 | Copolymer | Formula (14-1) | 91.8 | 8 | 0.2 | -3.6 |
| 2-2 | | | 89 | 8 | 3 | -3.2 |
| 2-3 | Copolymer | Formula (14-2) | 91.8 | 8 | 0.2 | -2.8 |
| 2-4 | | | 89 | 8 | 3 | -2.7 |
| 2-5 | Copolymer | Formula (16-1) | 91.8 | 8 | 0.2 | -2.9 |
| 2-6 | | | 89 | 8 | 3 | -3.0 |
| 2-7 | Copolymer | Formula (16-2) | 91.8 | 8 | 0.2 | -3.0 |
| 2-8 | | | 89 | 8 | 3 | -3.1 |
| 2-9 | Copolymer | — | 92 | 8 | — | -3.9 |
| 2-10 | Homopolymer | Formula (14-1) | — | — | 100 | -7.8 |
| 2-11 | Copolymer + Homopolymer | — Formula (14-1) | 92 — | 8 — | — 100 | -5.7 |

VDF: vinylidene fluoride,
HFP: hexafluoropropylene,
HUC: hetero-unsaturated compound Also, in the case of using the hetero-unsaturated compound containing a sulfur-containing group (sulfonic acid group derivative) (Table 2), results similar to the case of using the hetero-unsaturated compound containing a nitrogen-containing group (cyano group) (Table 1) were obtained.

That is, when the copolymer (specific copolymer) containing vinylidene fluoride, hexafluoropropylene, and a hetero-unsaturated compound as components was used (Experimental Examples 2-1 to 2-8), the deterioration rate increased as compared with the case where the specific copolymer was not used (Experimental Examples 2-9 to 2-11).

Experimental Examples 3-1 to 3-9

As shown in Table 3, a secondary battery was fabricated in the same procedure as in Experimental Examples 1-1 to 1-15, except that a hetero-unsaturated compound containing a phosphorus-containing group (phosphate group derivative) was used instead of the hetero-unsaturated compound containing a nitrogen-containing group (cyano group), and the battery characteristics (capacity deterioration characteristics) of the secondary battery were evaluated.

TABLE 3

Heteroatom: Phosphorus atom

| Experimental Example | Polymer Kind | | Composition (wt %) | | | Deterioration rate |
|---|---|---|---|---|---|---|
| | Polymerization type | HUC | VDF | HFP | HUC | |
| 3-1 | Copolymer | Formula (23-1) | 91.8 | 8 | 0.2 | -3.5 |
| 3-2 | | | 89 | 8 | 3 | -3.4 |
| 3-3 | Copolymer | Formula (23-2) | 91.8 | 8 | 0.2 | -3.0 |
| 3-4 | | | 89 | 8 | 3 | -2.9 |
| 3-5 | Copolymer | Formula (24-1) | 91.8 | 8 | 0.2 | -3.1 |
| 3-6 | | | 89 | 8 | 3 | -3.2 |
| 3-7 | Copolymer | — | 92 | 8 | — | -3.9 |
| 3-8 | Homopolymer | Formula (23-1) | — | — | 100 | -5.2 |
| 3-9 | Copolymer + Homopolymer | — Formula (23-1) | 92 — | 8 — | — 100 | -4.3 |

VDF: vinylidene fluoride,
HFP: hexafluoropropylene,
HUC: hetero-unsaturated compound Also, in the case of using the hetero-unsaturated compound containing a phosphorus-containing group (phosphate group derivative) (Table 3), results similar to the case of using the hetero-unsaturated compound containing a nitrogen-containing group (cyano group) (Table 1) were obtained.

That is, when the copolymer (specific copolymer) containing vinylidene fluoride, hexafluoropropylene, and a hetero-unsaturated compound as components was used (Experimental Examples 3-1 to 3-6), the deterioration rate increased as compared with the case where the specific copolymer was not used (Experimental Examples 3-7 to 3-9).

From the results shown in Tables 1 to 3, when the polymer compound included in the electrolyte layer contained the specific copolymer, the capacity deterioration characteristics of the secondary battery were improved. Thus, excellent battery characteristics were obtained in the secondary battery including the electrolyte layer.

The present technology is described thus far with reference to embodiments and examples thereof; however, the present technology is not limited to the examples described in the embodiments and examples above, but various modifications may be made. For example, the description has been given of, as an example, the case in which the battery structure is of a laminated-film-type or a coin type and the battery element has a spirally wound structure. However, applicable structures are not limited thereto. The secondary battery of the present technology is similarly applicable to a case where the secondary battery has other battery structure such as a cylindrical type or a square type, and to a case where the battery element has other structure such as a stacked structure.

Moreover, in the above embodiment and examples, description has been given of the lithium ion secondary battery in which the capacitance of the negative electrode is obtained by insertion and extraction of lithium. However, this is not limitative. For example, the secondary battery of the present technology may be a lithium metal secondary battery in which the capacitance of the negative electrode is obtained by precipitation and dissolution of lithium. Alternatively, the secondary battery of the present technology may be a secondary battery in which the capacitance of the negative electrode is obtained as the sum of the capacitance obtained by insertion and extraction of lithium and the capacitance obtained by precipitation and dissolution of lithium by causing the capacitance of the negative electrode material capable of inserting and extracting lithium to be smaller than the capacitance of the positive electrode.

Moreover, the description has been given of the case where lithium is used as the electrode reactant in the above embodiment and examples. However, the electrode reactant is not limited thereto. The electrode reactant may be, for example, other Group 1 element such as sodium (Na) and potassium (K) in the long form of the periodic table, a Group 2 element such as magnesium (Mg) and calcium (Ca) in the long form of the periodic table, or other light metal such as aluminum (Al). Alternatively, the electrode reactant may be an alloy including one or more of the foregoing series of elements.

The effects described in the present specification are illustrative and non-limiting, and other suitable properties relating to the present technology may be realized and will be apparent from the detailed description as described herein.

The present technology is described below in further detail according to an embodiment.

(1)
A secondary battery including:
a positive electrode;
a negative electrode; and
an electrolyte layer including an electrolytic solution and a copolymer containing vinylidene fluoride, hexafluoropropylene, and a hetero-unsaturated compound as components.

(2)
The secondary battery according to (1), in which the hetero-unsaturated compound contains at least one of a nitrogen atom (N), a sulfur atom (S), and a phosphorus atom (P) as a constituent atom.

(3)
The secondary battery according to (2), in which
the hetero-unsaturated compound contains the nitrogen atom as a constituent atom, and
the hetero-unsaturated compound contains at least one of a cyano group (—CN), a nitro group (—NO$_2$), and an amino group (—NH$_2$).

(4)
The secondary battery according to (3), in which the hetero-unsaturated compound includes at least one of compounds represented by respective formulas (1) to (3) below:

[Chemical Formula 10]

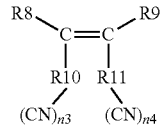
(1)

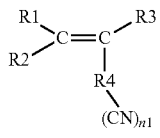
(2)

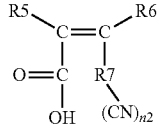

-continued

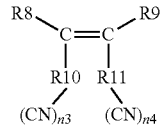
(3)

where each of R1 to R3, R5, R6, R8, and R9 is one of a hydrogen group, a monovalent hydrocarbon group, and a monovalent halogenated hydrocarbon group, R4 is one of a (1+n1)-valent oxygen-containing hydrocarbon group and a (1+n1)-valent halogenated oxygen-containing hydrocarbon group, R7 is one of a (1+n2)-valent oxygen-containing hydrocarbon group and a (1+n2)-valent halogenated oxygen-containing hydrocarbon group, R10 is one of a (1+n3)-valent oxygen-containing hydrocarbon group and a (1+n3)-valent halogenated oxygen-containing hydrocarbon group, R11 is one of a (1+n4)-valent oxygen-containing hydrocarbon group and a (1+n4)-valent halogenated oxygen-containing hydrocarbon group, each of n1 to n4 is an integer of not less than 1, and each of R4, R7, R10 and R11 is optionally omitted.

(5)
The secondary battery according to (2), in which
the hetero-unsaturated compound contains the sulfur atom as a constituent atom, and
the hetero-unsaturated compound contains at least one of a sulfonic acid group (—SO$_3$H) and a sulfonic acid group derivative represented by a formula (10) below:

$$—SO_3—R100 \quad (10)$$

where R100 is one of a monovalent hydrocarbon group, a monovalent oxygen-containing hydrocarbon group, a monovalent halogenated hydrocarbon group, and a monovalent halogenated oxygen-containing hydrocarbon group.

(6)
The secondary battery according to (5), in which the hetero-unsaturated compound includes at least one of compounds represented by respective formulas (11) to (13) below:

[Chemical Formula 11]

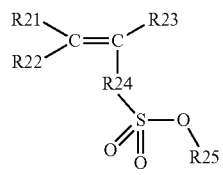
(11)

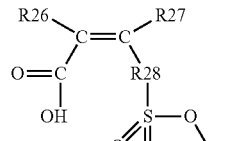
(12)

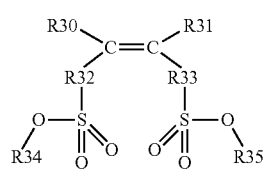
(13)

where each of R21 to R23, R25 to R27, R29 to R31, R34, and R35 is one of a hydrogen group, a monovalent hydrocarbon group, and a monovalent halogenated hydrocarbon group, each of R24, R28, R32 and R33 is one of a divalent oxygen-containing hydrocarbon group and a divalent halogenated oxygen-containing hydrocarbon group, and each of R24, R28, R32 and R33 is optionally omitted.

(7)

The secondary battery according to (2), in which the hetero-unsaturated compound contains the phosphorus atom as a constituent atom, and the hetero-unsaturated compound contains at least one of a phosphate group (—H$_2$PO$_4$) and a phosphate group derivative represented by a formula (19) below:

—R101R102PO$_4$ (19)

where each of R101 and R102 is one of a monovalent hydrocarbon group, a monovalent oxygen-containing hydrocarbon group, a monovalent halogenated hydrocarbon group, and a monovalent halogenated oxygen-containing hydrocarbon group.

(8)

The secondary battery according to (7), in which the hetero-unsaturated compound includes at least one of compounds represented by respective formulas (20) to (22) below:

[Chemical Formula 12]

(20)

(21)

(22)

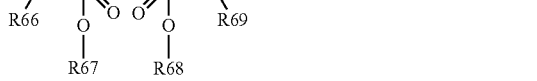

where each of R51 to R53, R55 to R58, R60 to R63, and R66 to R69 is one of a hydrogen group, a monovalent hydrocarbon group, and a monovalent halogenated hydrocarbon group, each of R54, R59, R64 and R65 is one of a divalent oxygen-containing hydrocarbon group and a divalent halogenated oxygen-containing hydrocarbon group, and each of R54, R59, R64 and R65 is optionally omitted.

(9)

The secondary battery according to any one of (1) to (8), in which a copolymerization amount of the vinylidene fluoride in the copolymer is 70 wt % to 98.9 wt %, a copolymerization amount of the hexafluoropropylene in the copolymer is 1 wt % to 20 wt %, and a copolymerization amount of the hetero-unsaturated compound in the copolymer is 0.1 wt % to 10 wt %.

(10)

The secondary battery according to any one of (1) to (9), in which the copolymer further contains at least one of monomethyl maleate, trifluoroethylene, and chlorotrifluoroethylene as a component.

(11)

The secondary battery according to any one of (1) to (10), in which the electrolyte layer further includes a plurality of inorganic particles, and the plurality of inorganic particles contain at least one of aluminum oxide, zirconium oxide, titanium oxide, and magnesium oxide.

(12)

The secondary battery according to any one of (1) to (11), in which the electrolytic solution contains at least one of ethylene carbonate, propylene carbonate, butylene carbonate, dimethyl carbonate, diethyl carbonate, ethyl methyl carbonate, and methyl propyl carbonate.

(13)

The secondary battery according to any one of (1) to (12), in which the electrolytic solution contains at least one of lithium hexafluorophosphate, lithium tetrafluoroborate, lithium perchlorate, and lithium hexafluoroarsenate.

(14)

The secondary battery according to any one of (1) to (13), in which the electrolytic solution contains at least one of an unsaturated cyclic carbonate ester, a halogenated carbonate ester, a sulfonate ester, an acid anhydride, a dicyano compound, a diisocyanate compound, a phosphoric ester, and a chain compound having a carbon-carbon triple bond, the unsaturated cyclic carbonate ester includes at least one of vinylene carbonate, vinyl ethylene carbonate, and methylvinylene carbonate, the halogenated carbonate ester includes at least one of 4-fluoro-1,3-dioxolan-2-one, 4,5-difluoro-1,3-dioxolan-2-one, fluoromethyl methyl carbonate, bis(fluoromethyl) carbonate, and difluoromethyl methyl carbonate, the sulfonate ester includes at least one of 1,3-propane sultone and 1,3-propene sultone, the acid anhydride includes at least one of succinic anhydride, glutaric anhydride, maleic anhydride, ethanedisulfonic anhydride, propane disulfonic anhydride, sulfobenzoic anhydride, sulfopropionic anhydride, and sulfobutyric anhydride, the dicyano compound includes at least one of succinonitrile, glutaronitrile, adiponitrile, and phthalonitrile, the diisocyanate compound includes hexamethylene diisocyanate, the phosphoric ester includes at least one of trimethyl phosphate and triethyl phosphate, and the chain compound having a carbon-carbon triple bond includes at least one of propargyl methyl carbonate and propargyl methyl sulfonate.

(15)
The secondary battery according to any one of (1) to (14), which is a lithium ion secondary battery.
(16)
A battery pack including:
the secondary battery according to any one of (1) to (15);
a controller that controls an operation of the secondary battery; and
a switch section that switches the operation of the secondary battery according to an instruction of the controller.
(17)
An electric vehicle including:
the secondary battery according to any one of (1) to (15);
a convertor that converts electric power supplied from the secondary battery into drive power;
a drive section that operates according to the drive power; and
a controller that controls an operation of the secondary battery.
(18)
An electric power storage system including:
the secondary battery according to any one of (1) to (15);
at least one electrical appliance that is supplied with electric power from the secondary battery; and
a controller that controls electric power supply from the secondary battery to the electrical appliance.
(19)
An electric power tool including:
the secondary battery according to any one of (1) to (15); and
a movable section that is supplied with electric power from the secondary battery.
(20)
An electronic apparatus including the secondary battery according to any one of (1) to (15) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a positive electrode;
a negative electrode; and
an electrolyte layer including an electrolytic solution and a copolymer,
wherein the copolymer includes vinylidene fluoride, hexafluoropropylene, and a hetero-unsaturated compound, and wherein the hetero-unsaturated compound includes one or more of compounds represented by respective chemical formulas (1) to (3) below:

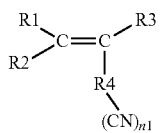

(1)

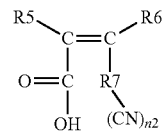

(2)

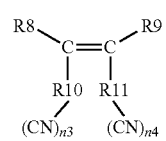

(3)

wherein each of R1 to R3, R5, R6, R8, and R9 includes one or more of a hydrogen group, a monovalent hydrocarbon group, and a monovalent halogenated hydrocarbon group, and R4 includes one or more of a (1+n1)-valent oxygen-containing hydrocarbon group and a (1+n1)-valent halogenated oxygen-containing hydrocarbon group, and R7 includes one or more of a (1+n2)-valent oxygen-containing hydrocarbon group and a (1+n2)-valent halogenated oxygen-containing hydrocarbon group, and R10 includes one or more of a (1+n3)-valent oxygen-containing hydrocarbon group and a (1+n3)-valent halogenated oxygen-containing hydrocarbon group, and R11 includes one or more of a (1+n4)-valent oxygen-containing hydrocarbon group and a (1+n4)-valent halogenated oxygen-containing hydrocarbon group, and each of n1 to n4 is an integer of not less than 1.

2. The secondary battery according to claim 1, wherein
a first copolymerization amount of the vinylidene fluoride in the copolymer is from 70 wt % to 98.9 wt %,
a second copolymerization amount of the hexafluoropropylene in the copolymer is from 1 wt % to 20 wt %, and
a third copolymerization amount of the hetero-unsaturated compound in the copolymer from is 0.1 wt % to 10 wt %.

3. The secondary battery according to claim 1, wherein the copolymer further includes one or more of monomethyl maleate, trifluoroethylene, and chlorotrifluoroethylene.

4. The secondary battery according to claim 1, wherein
the electrolyte layer further includes a plurality of inorganic particles, and
the plurality of inorganic particles includes one or more of aluminum oxide, zirconium oxide, titanium oxide, and magnesium oxide.

5. The secondary battery according to claim 1, wherein the electrolytic solution includes one or more of ethylene carbonate, propylene carbonate, butylene carbonate, dimethyl carbonate, diethyl carbonate, ethyl methyl carbonate, and methyl propyl carbonate.

6. The secondary battery according to claim 1, wherein the electrolytic solution includes one or more of lithium hexafluorophosphate, lithium tetrafluoroborate, lithium perchlorate, and lithium hexafluoroarsenate.

7. The secondary battery according to claim 1, wherein
the electrolytic solution includes one or more of an unsaturated cyclic carbonate ester, a halogenated carbonate ester, a sulfonate ester, an acid anhydride, a dicyano compound, a diisocyanate compound, a phosphoric ester, and a chain compound having a carbon-carbon triple bond,
the unsaturated cyclic carbonate ester includes one or more of vinylene carbonate, vinyl ethylene carbonate, and methylene ethylene carbonate,
the halogenated carbonate ester includes one or more of 4-fluoro-1,3-dioxolan-2-one, 4,5-difluoro-1,3-dioxolan-2-one, fluoromethyl methyl carbonate, bis(fluoromethyl) carbonate, and difluoromethyl methyl carbonate, the sulfonate ester includes one or more of 1,3-propane sultone and 1,3-propene sultone, the acid anhydride includes one or more of succinic anhydride, glutaric anhydride, maleic anhydride, ethanedisulfonic anhydride, propane disulfonic anhydride, sulfobenzoic anhydride, sulfopropionic anhydride, and sulfobutyric anhydride, the dicyano compound includes one or more of succinonitrile, glutaronitrile, adiponitrile, and phthalonitrile, the diisocyanate compound includes hexamethylene diisocyanate, the phosphoric ester includes one or more of trimethyl phosphate and triethyl phosphate, and the chain compound having a carbon-carbon triple bond includes one or more of propargyl methyl carbonate and propargyl methyl sulfonate.

8. The secondary battery according to claim 1, wherein the secondary battery includes a lithium ion secondary battery.

9. A battery pack comprising:
the secondary battery according to claim 1;
a controller configured to control an operation of the secondary battery; and
a switch configured to switch the operation of the secondary battery according to an instruction of the controller.

10. An electric vehicle comprising:
the secondary battery according to claim 1;
a convertor configured to convert electric power supplied from the secondary battery into drive power;
a driver configured to operate according to the drive power; and
a controller configured to control an operation of the secondary battery.

11. An electric power storage system comprising:
the secondary battery according to claim 1;
at least one electrical appliance configured to be supplied with electric power from the secondary battery; and
a controller configured to control electric power supply from the secondary battery to the electrical appliance.

12. An electric power tool comprising:
the secondary battery according to claim 1; and
a movable section configured to be supplied with electric power from the secondary battery.

13. An electronic apparatus comprising the secondary battery according to claim 1 as an electric power supply source.

14. A secondary battery comprising:
a positive electrode;
a negative electrode; and
an electrolyte layer including an electrolytic solution and a copolymer, wherein the copolymer includes vinylidene fluoride, hexafluoropropylene, and a hetero-unsaturated compound, and wherein the hetero-unsaturated compound includes one or more of compounds represented by respective chemical formulas (11) to (13) below:

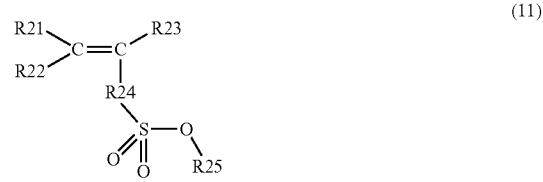

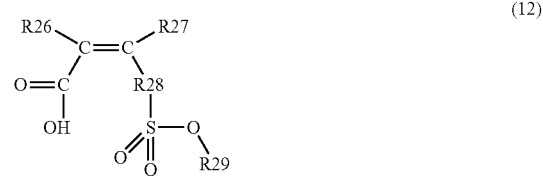

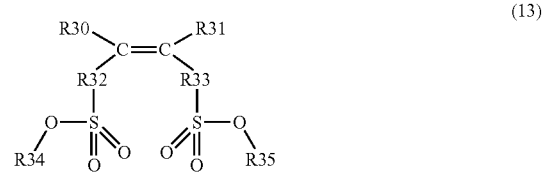

wherein each of R21 to R23, R25 to R27, R29 to R31, R34, and R35 includes one or more of a hydrogen group, a monovalent hydrocarbon group, and a monovalent halogenated hydrocarbon group, and each of R24, R28, R32 and R33 includes one or more of a divalent oxygen-containing hydrocarbon group and a divalent halogenated oxygen-containing hydrocarbon group.

15. The secondary battery according to claim 14, wherein
a first copolymerization amount of the vinylidene fluoride in the copolymer is from 70 wt % to 98.9 wt %,
a second copolymerization amount of the hexafluoropropylene in the copolymer is from 1 wt % to 20 wt %, and
a third copolymerization amount of the hetero-unsaturated compound in the copolymer from is 0.1 wt % to 10 wt %.

16. The secondary battery according to claim 14, wherein the copolymer further includes one or more of monomethyl maleate, trifluoroethylene, and chlorotrifluoroethylene.

17. The secondary battery according to claim 14, wherein
the electrolyte layer further includes a plurality of inorganic particles, and
the plurality of inorganic particles includes one or more of aluminum oxide, zirconium oxide, titanium oxide, and magnesium oxide.

18. The secondary battery according to claim 14, wherein the electrolytic solution includes one or more of ethylene carbonate, propylene carbonate, butylene carbonate, dimethyl carbonate, diethyl carbonate, ethyl methyl carbonate, and methyl propyl carbonate.

19. The secondary battery according to claim 14, wherein the electrolytic solution includes one or more of lithium hexafluorophosphate, lithium tetrafluoroborate, lithium perchlorate, and lithium hexafluoroarsenate.

20. The secondary battery according to claim 14, wherein
the electrolytic solution includes one or more of an unsaturated cyclic carbonate ester, a halogenated carbonate ester, a sulfonate ester, an acid anhydride, a dicyano compound, a diisocyanate compound, a phosphoric ester, and a chain compound having a carbon-carbon triple bond,
the unsaturated cyclic carbonate ester includes one or more of vinylene carbonate, vinyl ethylene carbonate, and methylene ethylene carbonate, the halogenated carbonate ester includes one or more of 4-fluoro-1,3-dioxolan-2-one, 4,5-difluoro-1,3-dioxolan-2-one, fluoromethyl methyl carbonate, bis(fluoromethyl) carbonate, and difluoromethyl methyl carbonate, the sulfonate ester includes one or more of 1,3-propane sultone and 1,3-propene sultone, the acid anhydride includes one or more of succinic anhydride, glutaric anhydride, maleic anhydride, ethanedisulfonic anhydride, propane disulfonic anhydride, sulfobenzoic anhydride, sulfopropionic anhydride, and sulfobutyric anhydride, the dicyano compound includes one or more of succinonitrile, glutaronitrile, adiponitrile, and phthalonitrile, the diisocyanate compound includes hexamethylene diisocyanate, the phosphoric ester includes one or more of trimethyl phosphate and triethyl phosphate, and the chain compound having a carbon-carbon triple bond includes one or more of propargyl methyl carbonate and propargyl methyl sulfonate.

21. The secondary battery according to claim 14, wherein the secondary battery includes a lithium ion secondary battery.

22. An apparatus comprising the secondary battery according to claim 14.

23. The apparatus according to claim 22, wherein the apparatus includes one or more of a battery pack, an electric vehicle, an electronic apparatus, and an electric power tool.

24. An electric power storage system comprising:
the secondary battery according to claim 14;
at least one electrical appliance configured to be supplied with electric power from the secondary battery; and
a controller configured to control electric power supply from the secondary battery to the electrical appliance.

25. A secondary battery comprising:
a positive electrode;
a negative electrode; and
an electrolyte layer including an electrolytic solution and a copolymer,
wherein the copolymer includes vinylidene fluoride, hexafluoropropylene, and a hetero-unsaturated compound, and wherein the hetero-unsaturated compound includes one or more of compounds represented by respective chemical formulas (20) to (22) below:

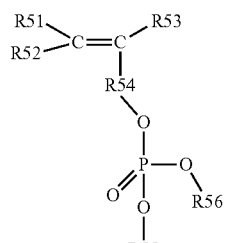

(20)

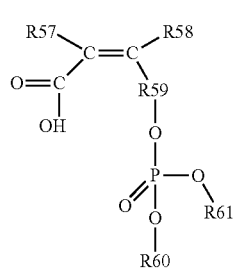

(21)

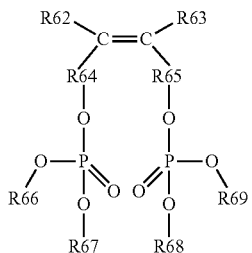

(22)

wherein each of R51 to R53, R55 to R58, R60 to R63, and R66 to R69 includes one or more of a hydrogen group, a monovalent hydrocarbon group, and a monovalent halogenated hydrocarbon group, and each of R54, R59, R64 and R65 includes one or more of a divalent oxygen-containing hydrocarbon group and a divalent halogenated oxygen-containing hydrocarbon group.

26. The secondary battery according to claim 25, wherein
a first copolymerization amount of the vinylidene fluoride in the copolymer is from 70 wt % to 98.9 wt %,
a second copolymerization amount of the hexafluoropropylene in the copolymer is from 1 wt % to 20 wt %, and
a third copolymerization amount of the hetero-unsaturated compound in the copolymer from is 0.1 wt % to 10 wt %.

27. The secondary battery according to claim 25, wherein the copolymer further includes one or more of monomethyl maleate, trifluoroethylene, and chlorotrifluoroethylene.

28. The secondary battery according to claim 25, wherein the electrolyte layer further includes a plurality of inorganic particles, and
the plurality of inorganic particles includes one or more of aluminum oxide, zirconium oxide, titanium oxide, and magnesium oxide.

29. The secondary battery according to claim 25, wherein the electrolytic solution includes one or more of ethylene carbonate, propylene carbonate, butylene carbonate, dimethyl carbonate, diethyl carbonate, ethyl methyl carbonate, and methyl propyl carbonate.

30. The secondary battery according to claim 25, wherein the electrolytic solution includes one or more of lithium hexafluorophosphate, lithium tetrafluoroborate, lithium perchlorate, and lithium hexafluoroarsenate.

31. The secondary battery according to claim 25, wherein
the electrolytic solution includes one or more of an unsaturated cyclic carbonate ester, a halogenated carbonate ester, a sulfonate ester, an acid anhydride, a dicyano compound, a diisocyanate compound, a phosphoric ester, and a chain compound having a carbon-carbon triple bond,
the unsaturated cyclic carbonate ester includes one or more of vinylene carbonate, vinyl ethylene carbonate, and methylene ethylene carbonate,
the halogenated carbonate ester includes one or more of 4-fluoro-1,3-dioxolan-2-one, 4,5-difluoro-1,3-dioxolan-2-one, fluoromethyl methyl carbonate, bis(fluoromethyl) carbonate, and difluoromethyl methyl carbonate,
the sulfonate ester includes one or more of 1,3-propane sultone and 1,3-propene sultone,
the acid anhydride includes one or more of succinic anhydride, glutaric anhydride, maleic anhydride, ethanedisulfonic anhydride, propane disulfonic anhydride, sulfobenzoic anhydride, sulfopropionic anhydride, and sulfobutyric anhydride, the dicyano compound includes one or more of succinonitrile, glutaronitrile, adiponitrile, and phthalonitrile, the diisocyanate compound includes hexamethylene diisocyanate, the phosphoric ester includes one or more of trimethyl phosphate and triethyl phosphate, and the chain compound having a carbon-carbon triple bond includes one or more of propargyl methyl carbonate and propargyl methyl sulfonate.

32. The secondary battery according to claim 25, wherein the secondary battery includes a lithium ion secondary battery.

33. An apparatus comprising the secondary battery according to claim 25.

34. The apparatus according to claim 33, wherein the apparatus includes one or more of a battery pack, an electric vehicle, an electronic apparatus, and an electric power tool.

35. An electric power storage system comprising:
the secondary battery according to claim 25;
at least one electrical appliance configured to be supplied with electric power from the secondary battery; and
a controller configured to control electric power supply from the secondary battery to the electrical appliance.

* * * * *